(12) United States Patent
Wolrich et al.

(10) Patent No.: US 10,581,594 B2
(45) Date of Patent: *Mar. 3, 2020

(54) INSTRUCTIONS PROCESSORS, METHODS, AND SYSTEMS TO PROCESS SECURE HASH ALGORITHMS

(71) Applicant: Intel Corporation, Santa Clara, CA (US)

(72) Inventors: Gilbert M. Wolrich, Framingham, MA (US); Kirk S. Yap, Westborough, MA (US); Vinodh Gopal, Westborough, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,519

(22) Filed: Jun. 25, 2018

(65) Prior Publication Data

US 2019/0116025 A1 Apr. 18, 2019

Related U.S. Application Data

(63) Continuation of application No. 15/401,877, filed on Jan. 9, 2017, now Pat. No. 10,009,172, which is a (Continued)

(51) Int. Cl.
*H04L 9/06* (2006.01)
*G06F 21/64* (2013.01)
(Continued)

(52) U.S. Cl.
CPC ........ *H04L 9/0643* (2013.01); *G06F 9/30007* (2013.01); *G06F 9/3016* (2013.01);
(Continued)

(58) Field of Classification Search
CPC ... G09C 1/00; G01R 31/31705; G06F 21/602; G06F 21/64; G06F 21/72; G06F 9/30007;
(Continued)

(56) References Cited

U.S. PATENT DOCUMENTS

| | | |
|---|---|---|
| 4,250,483 A | 2/1981 | Rubner |
| 5,339,398 A | 8/1994 | Shah et al. |

(Continued)

FOREIGN PATENT DOCUMENTS

| | | |
|---|---|---|
| CN | 1684412 A | 10/2005 |
| CN | 101350716 A | 1/2009 |

(Continued)

OTHER PUBLICATIONS

Advisory Action from U.S. Appl. No. 13/729,502, dated Aug. 10, 2015, 3 pages.

(Continued)

*Primary Examiner* — Abiy Getachew
(74) *Attorney, Agent, or Firm* — NDWE, LLP

(57) ABSTRACT

A method of an aspect includes receiving an instruction. The instruction indicates a first source of a first packed data including state data elements $a_i$, $b_i$, $e_i$, and $f_i$ for a current round (i) of a secure hash algorithm 2 (SHA2) hash algorithm. The instruction indicates a second source of a second packed data. The first packed data has a width in bits that is less than a combined width in bits of eight state data elements $a_i$, $b_i$, $c_i$, $d_i$, $e_i$, $f_i$, $g_i$, $h_i$ of the SHA2 hash algorithm. The method also includes storing a result in a destination indicated by the instruction in response to the instruction. The result includes updated state data elements $a_{i+}$, $b_{i+}$, $e_{i+}$, and $f_{i+}$ that have been updated from the corresponding state data elements $a_i$, $b_i$, $e_i$, and $f_i$ by at least one round of the SHA2 hash algorithm.

28 Claims, 26 Drawing Sheets

Related U.S. Application Data continuation of application No. 15/011,902, filed on Feb. 1, 2016, now Pat. No. 9,542,561, which is a continuation of application No. 13/729,502, filed on Dec. 28, 2012, now Pat. No. 9,251,377.

(51) Int. Cl.
  *G06F 9/30* (2018.01)
  *G06F 21/72* (2013.01)
  *G06F 21/60* (2013.01)

(52) U.S. Cl.
  CPC ...... *G06F 9/30036* (2013.01); *G06F 9/30101* (2013.01); *G06F 9/30145* (2013.01); *G06F 21/602* (2013.01); *G06F 21/64* (2013.01); *G06F 21/72* (2013.01)

(58) Field of Classification Search
  CPC ............. G06F 9/30036; G06F 9/30101; G06F 9/30145; G06F 9/3016; H04L 9/0643
  See application file for complete search history.

(56) References Cited

U.S. PATENT DOCUMENTS

| | | |
|---|---|---|
| 5,608,801 A | 3/1997 | Aiello et al. |
| 5,920,900 A | 7/1999 | Poole et al. |
| 5,960,434 A | 9/1999 | Schimmel |
| 6,067,547 A | 5/2000 | Douceur |
| RE37,178 E | 5/2001 | Kingdon |
| 6,226,710 B1 | 5/2001 | Melchior |
| 6,260,055 B1 | 7/2001 | Sugeno et al. |
| 6,307,955 B1 | 10/2001 | Zank et al. |
| 6,360,218 B1 | 3/2002 | Zander et al. |
| 6,470,329 B1 | 10/2002 | Livschitz |
| 6,539,373 B1 | 3/2003 | Guha |
| 6,578,131 B1 | 6/2003 | Larson et al. |
| 6,594,665 B1 | 7/2003 | Sowa et al. |
| 6,631,419 B1 | 10/2003 | Greene |
| 6,952,770 B1 | 10/2005 | Mittal et al. |
| 7,047,394 B1 | 5/2006 | Van Dyke et al. |
| 7,073,059 B2 | 7/2006 | Worley et al. |
| 7,165,135 B1 | 1/2007 | Christie et al. |
| 7,240,203 B2 | 7/2007 | Kessler et al. |
| 7,373,514 B2 | 5/2008 | Krueger et al. |
| 7,599,489 B1 | 10/2009 | Spracklen |
| 7,684,563 B1 | 3/2010 | Olson et al. |
| 7,725,624 B2 | 5/2010 | Feghali et al. |
| 7,743,235 B2 | 6/2010 | Wolrich et al. |
| 8,020,142 B2 | 9/2011 | Wolrich et al. |
| 8,073,892 B2 | 12/2011 | Feghali et al. |
| 8,255,703 B2 | 8/2012 | Crispin et al. |
| 8,316,191 B2 | 11/2012 | Wheeler et al. |
| 8,504,802 B2 | 8/2013 | Valentine et al. |
| 8,634,550 B2 | 1/2014 | Gueron et al. |
| 8,838,997 B2 | 9/2014 | Wolrich et al. |
| 9,027,104 B2 | 5/2015 | Wolrich et al. |
| 9,251,377 B2 | 2/2016 | Wolrich et al. |
| 9,542,561 B2 | 1/2017 | Wolrich et al. |
| 2002/0032551 A1 | 3/2002 | Zakiya |
| 2002/0184498 A1 | 12/2002 | Qi |
| 2003/0172252 A1 | 9/2003 | Henry et al. |
| 2003/0185391 A1 | 10/2003 | Qi et al. |
| 2005/0044134 A1 | 2/2005 | Krueger et al. |
| 2005/0089160 A1 | 4/2005 | Crispin et al. |
| 2009/0022307 A1 | 1/2009 | Torla |
| 2009/0141887 A1* | 6/2009 | Yap .................. H04L 9/0643 380/28 |
| 2009/0310775 A1 | 12/2009 | Gueron et al. |
| 2010/0250966 A1* | 9/2010 | Olson .................. H04L 9/12 713/190 |
| 2010/0268916 A1 | 10/2010 | Hu et al. |
| 2012/0128149 A1 | 5/2012 | Boersma et al. |
| 2012/0257742 A1 | 10/2012 | Ebeid et al. |
| 2012/0328097 A1 | 12/2012 | Sheikh et al. |
| 2013/0132737 A1 | 5/2013 | Horsnell et al. |
| 2013/0275718 A1* | 10/2013 | Ueda .................. G06F 9/30032 712/204 |
| 2014/0093069 A1 | 4/2014 | Wolrich et al. |
| 2014/0185793 A1* | 7/2014 | Wolrich .............. H04L 9/0643 380/28 |
| 2014/0189368 A1 | 7/2014 | Wolrich et al. |
| 2014/0189369 A1 | 7/2014 | Wolrich et al. |
| 2014/0195782 A1 | 7/2014 | Yap et al. |
| 2016/0162694 A1 | 6/2016 | Wolrich et al. |
| 2017/0126400 A1 | 5/2017 | Wolrich et al. |

FOREIGN PATENT DOCUMENTS

| | | |
|---|---|---|
| EP | 0354774 A2 | 2/1990 |
| GB | 1494750 A | 12/1977 |
| KR | 20090042293 A | 4/2009 |
| KR | 20100047592 A | 5/2010 |
| WO | 03090074 A2 | 10/2003 |
| WO | 2013147877 A1 | 10/2013 |
| WO | 2014105135 A1 | 7/2014 |

OTHER PUBLICATIONS

Chaves R., et al., "Improving SHA-2 Hardware Implementations," Cryptographic Hardware and Embedded Systems—CHES 2006, Oct. 10, 2006, 15 Pages.

Deepakumara J., et al., "FPGA Implementation of MD5 Hash Algorithm," Canadian Conference on Electrical and Computer Engineering, vol. 2, May 2001, pp. 919-924.

Docherty J., et al., "Hardware Implementation of SHA-1and SHA-2 Hash Functions," Newcastle University, Microelectronics System Design Research Group, School of Electrical, Electronic and Computer Engineering, 2011, 59 pages.

Final Office Action from U.S. Appl. No. 13/729,502, dated Feb. 25, 2015, 49 pages.

FIPS PUB 180-1, "Secure Hash Standard," Secretary of Commerce, National Institute of Standards and Technology, Apr. 17, 1995, 17 pages.

Intel, "Intel 64 and IA-32 Architectures Software Developer's Manual," vol. 1: Basic Architecture, Order No. 253665-040US, Oct. 2011, 548 pages.

Intel, "Intel 64 and IA-32 Architectures Software Developer's Manual," vol. 2 (2A, 2B & 2C): Instruction Set Reference, A-Z, Order No. 325383-040US, Oct. 2011, 1721 pages.

Intel, "Intel 64 and IA-32 Architectures Software Developer's Manual" vol. 3 (3A, 3B & 3C): System Programming Guide, Order No. 325384-040US, Oct. 2011, 1916 pages.

Intel, "Intel Advanced Vector Extensions Programming Reference," Document reference No. 319433-011, Jun. 2011, 595 pages.

International Preliminary Report on Patentability for Application No. PCT/US2013/046410, dated Jul. 9, 2015, 7 pages.

International Search Report and Written Opinion for Application No. PCT/US2013/046410, dated Sep. 27, 2013, 10 pages.

Jarvinen K., et al., "Hardware Implementation Analysis of the MD5 Flash Algorithm," Proceedings of the 38th Hawaii International Conference on System Sciences, 2005, pp. 1-10.

Non-Final Office Action from U.S. Appl. No. 13/729,502, dated Jul. 29, 2014, 50 pages.

Non-Final Office Action from U.S. Appl. No. 13/843,141, dated Aug. 15, 2014, 34 pages.

Non-Final Office Action from U.S. Appl. No. 15/401,877, dated Jun. 5, 2017, 33 pages.

Notice of Allowance from U.S. Appl. No. 15/401,877, dated Feb. 8, 2018, 35 pages.

Notice of Allowance and Search Report form foreign counterpart Chinese Patent Application No. 201380062069.0, dated Feb. 24, 2018, 8 pages.

Notice of Allowance from foreign counterpart Korean Patent Application No. 10-2015-7013432, dated Jan. 16, 2017, 3 pages.

Notice of Allowance from foreign counterpart Korean Patent Application No. 10-2017-7010445, dated Jan. 2, 2018, 2 pages.

(56) References Cited

OTHER PUBLICATIONS

Notice of Allowance from U.S. Appl. No. 13/729,502, dated Sep. 21, 2015, 9 pages.
Notice of Allowance from U.S. Appl. No. 13/731,004, dated Sep. 2, 2014, 12 pages.
Notice of Allowance from U.S. Appl. No. 13/843,141, dated Dec. 15, 2014 23 pages.
Notice of Allowance from U.S. Appl. No. 15/011,902, dated Aug. 29, 2016, 24 pages.
Office Action and Search Report from foreign counterpart Chinese Patent Application No. 201380062069.0, dated Apr. 1, 2017, 11 pages.
Office Action from foreign counterpart Chinese Patent Application No. 201380062069.0, dated Nov. 15, 2017, 7 pages.
Office Action from foreign counterpart Korean Patent Application No. 10-2015-7013432, dated Mar. 21, 2016, 11 pages.
Office Action from foreign counterpart Korean Patent Application No. 10-2017-7010445, dated Jul. 10, 2017, 5 pages.
Supplemental Notice of Allowance from U.S. Appl. No. 13/843,141, dated Apr. 9, 2015, 4 pages.
US Department of Commerce, Information Technology Laboratory, "Secure Hash Standard," (FIPS Pub 180-3) Federal Information Processing Standards Publication, Washington D.C., Oct. 2008, 32 pages.

\* cited by examiner

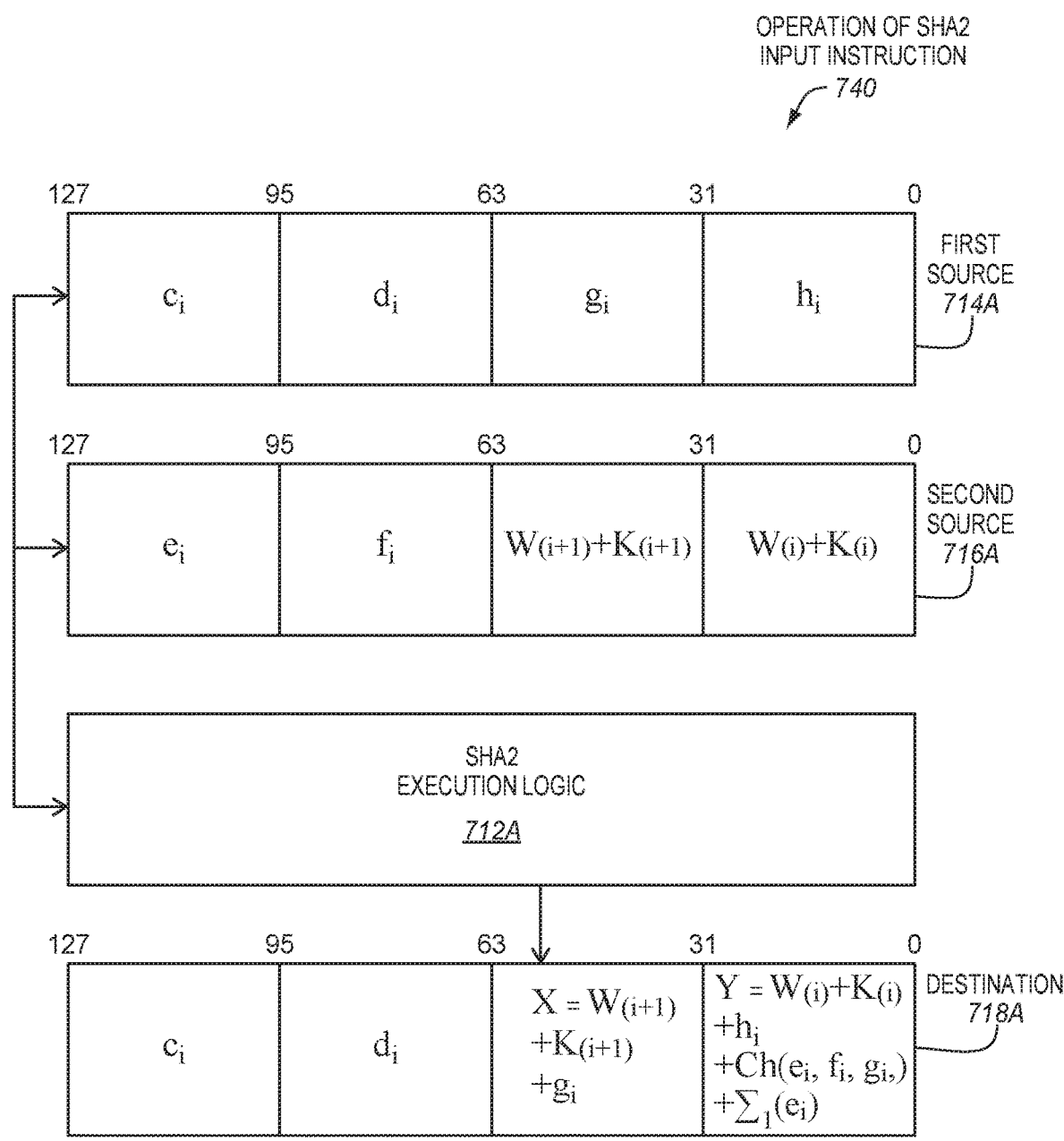

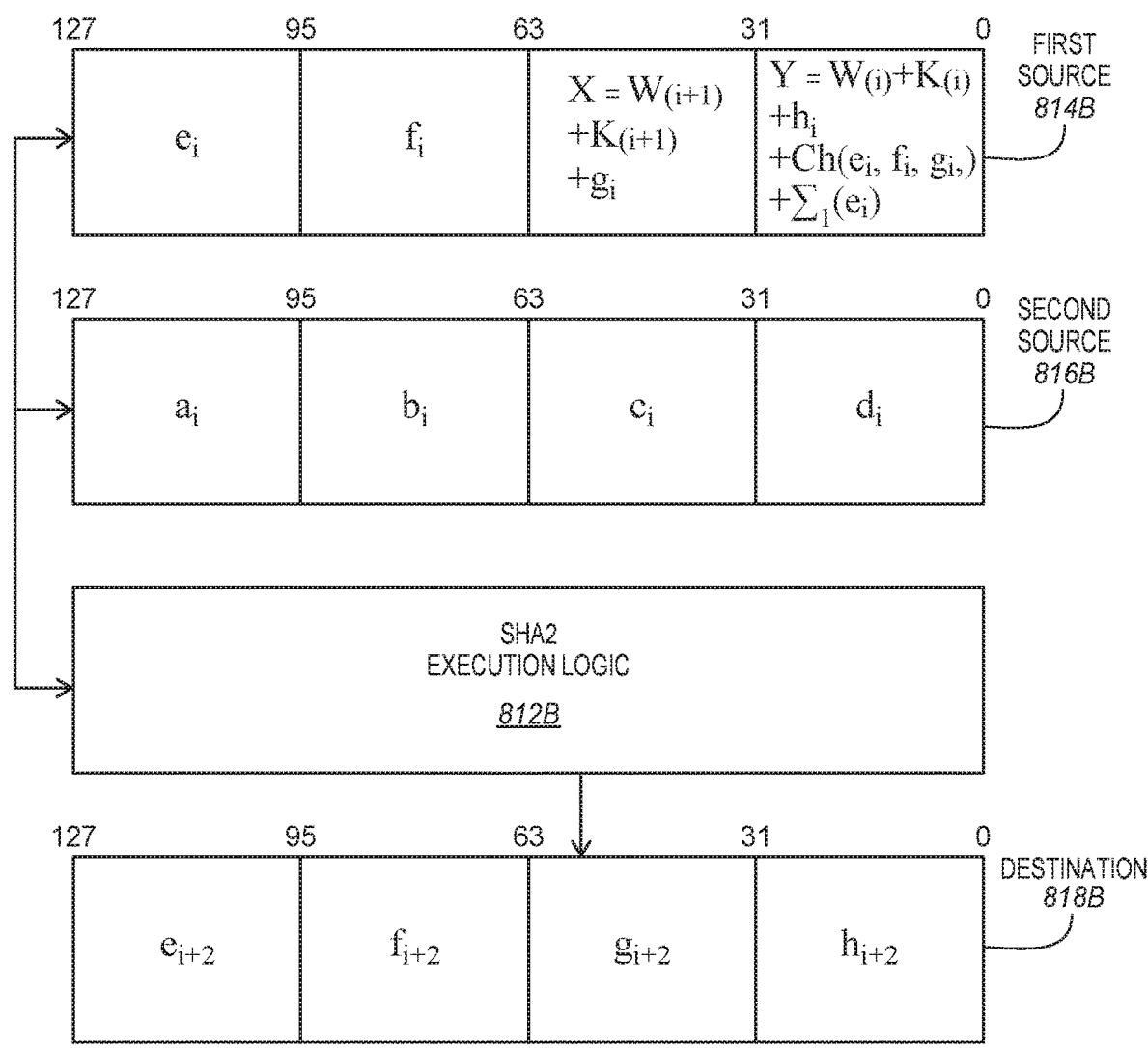

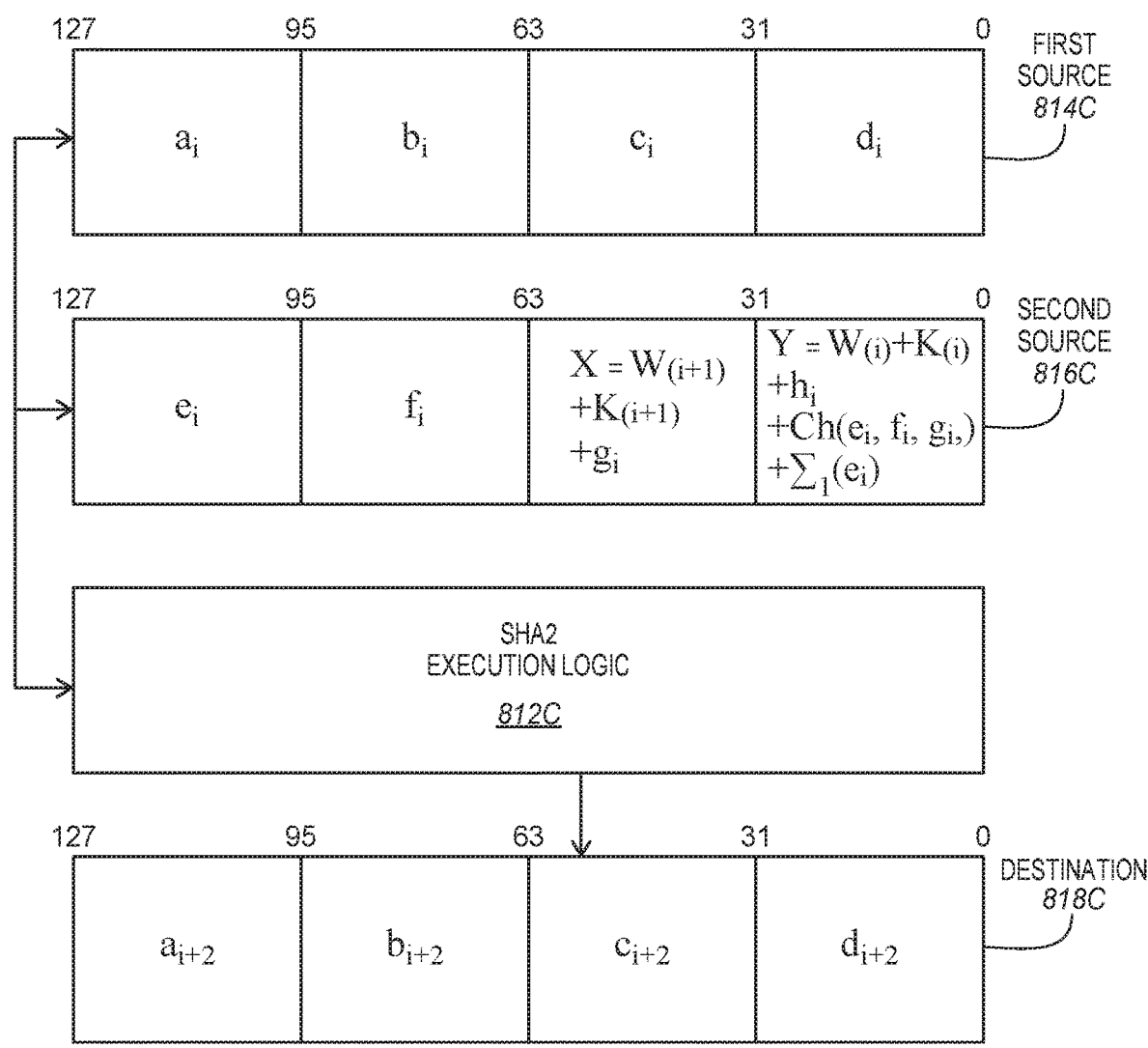

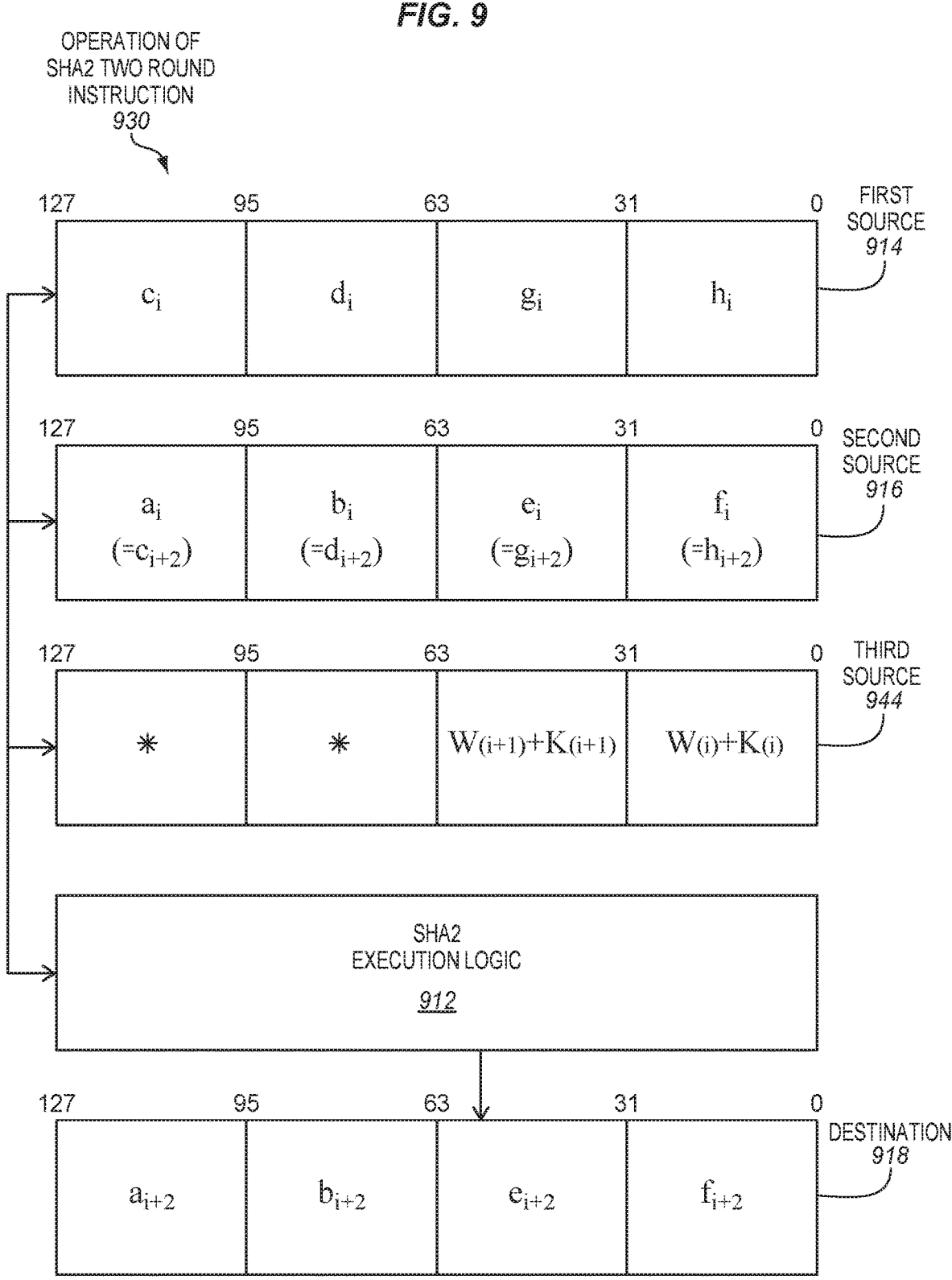

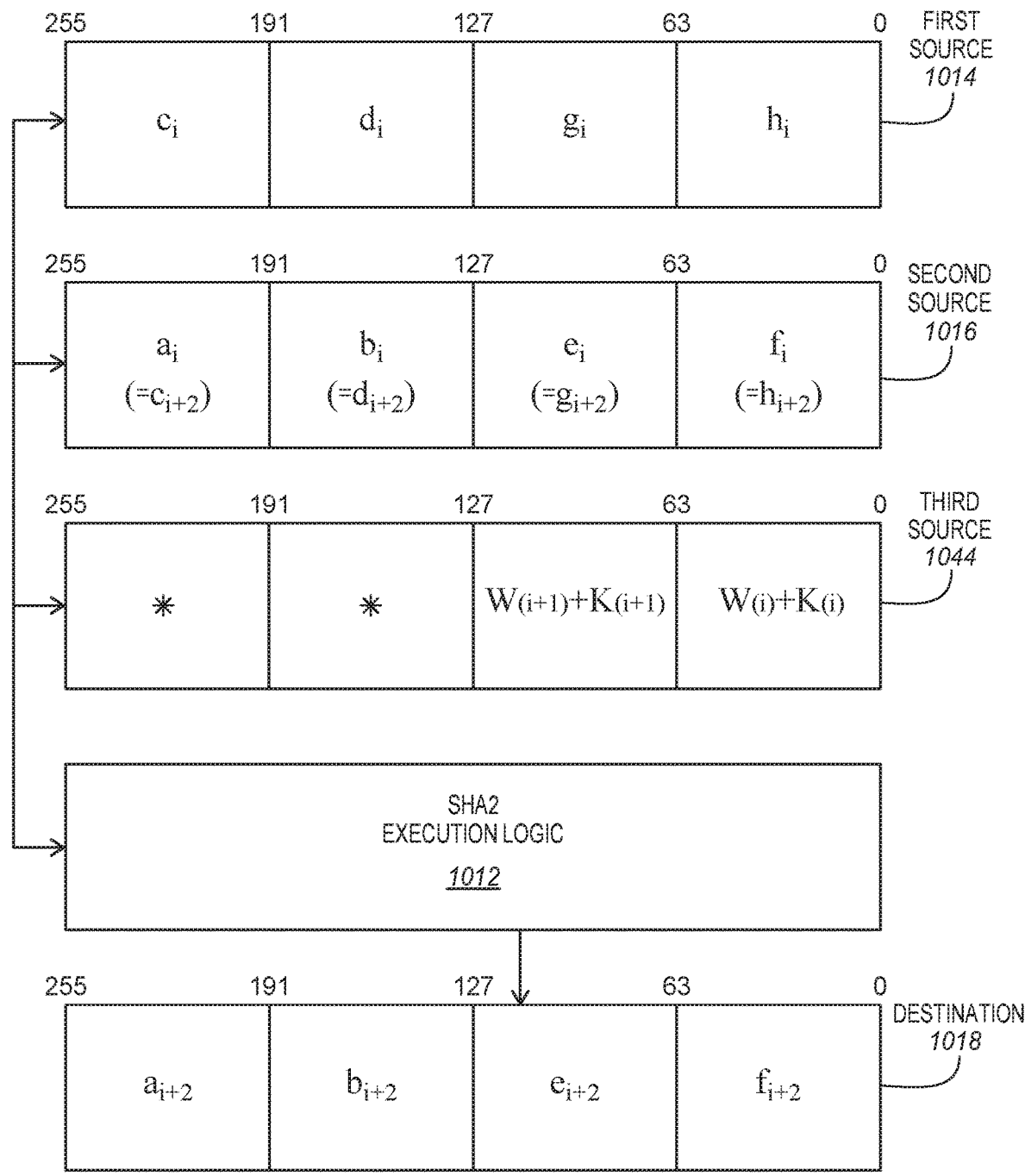

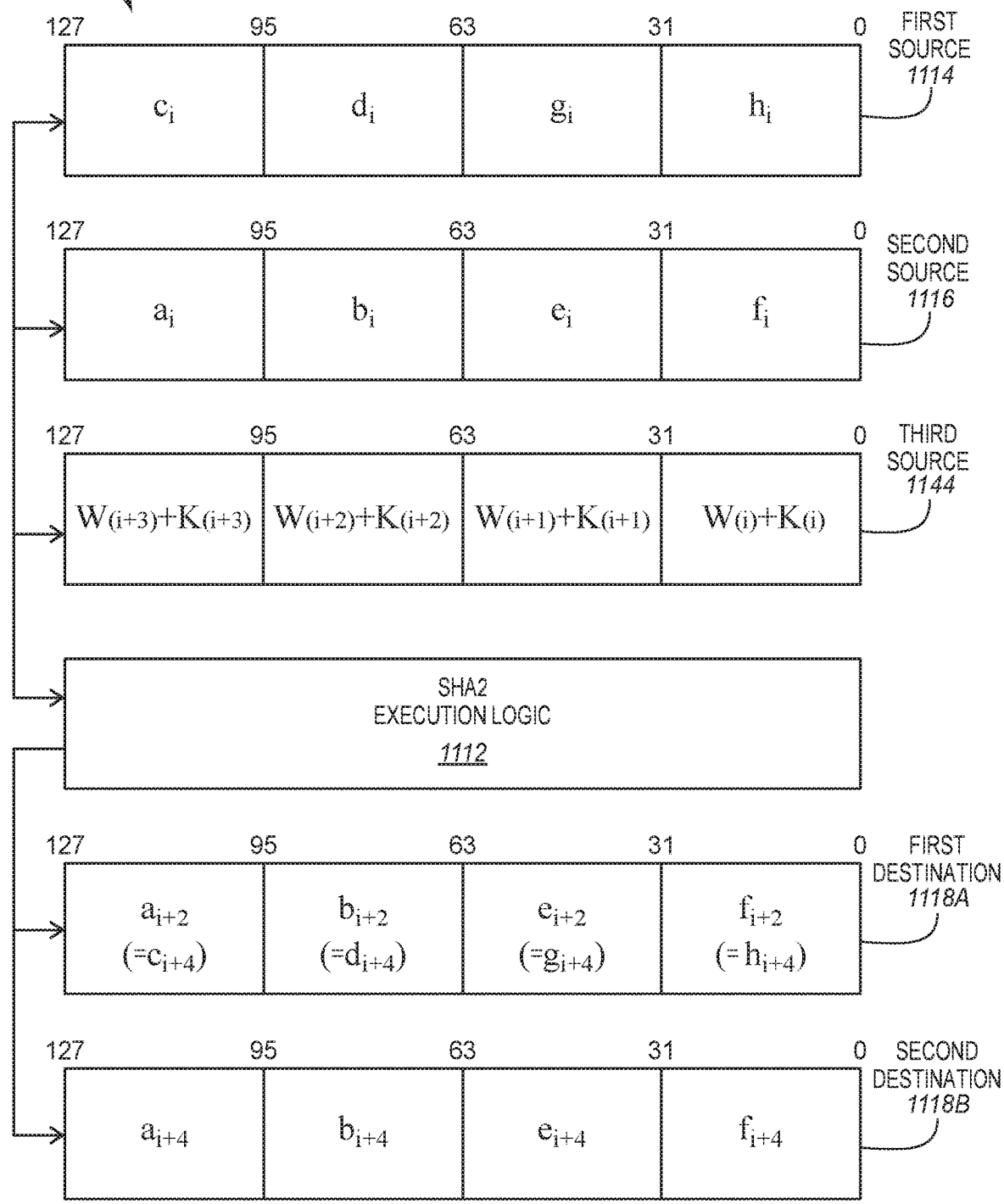

FIG. 13A

| OPCODE 1346A | FIRST SOURCE/ DESTINATION SPECIFIER 1348A | SECOND SOURCE SPECIFIER 1350A |

FIG. 13B

| OPCODE 1346B | FIRST SOURCE/ DESTINATION SPECIFIER 1348B | SECOND SOURCE SPECIFIER 1350B | THIRD SOURCE SPECIFIER (OPTIONAL) 1352B |

FIG. 13C

| OPCODE 1346C | FIRST SOURCE/ DESTINATION SPECIFIER 1348C | SECOND SOURCE/ DESTINATION SPECIFIER 1350C | THIRD SOURCE SPECIFIER (OPTIONAL) 1352C |

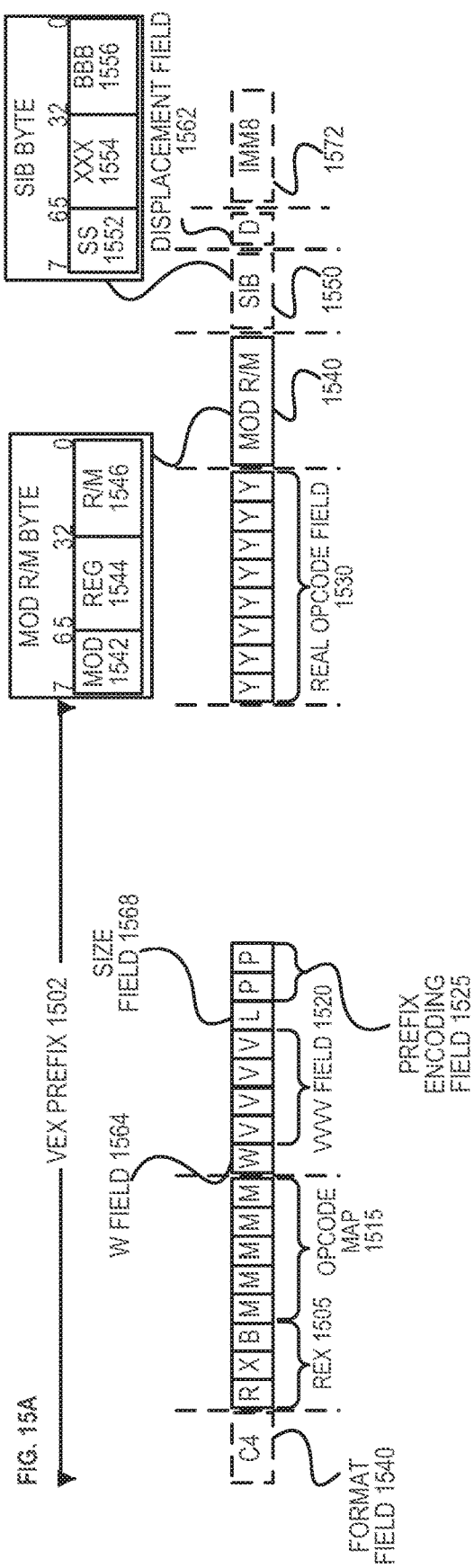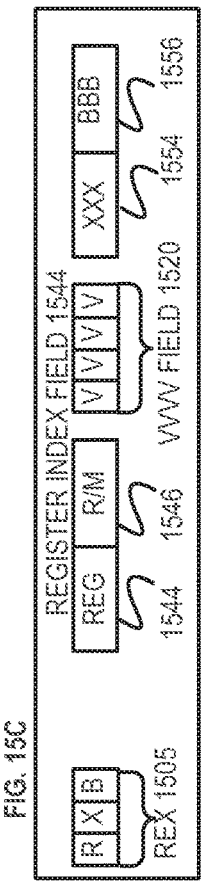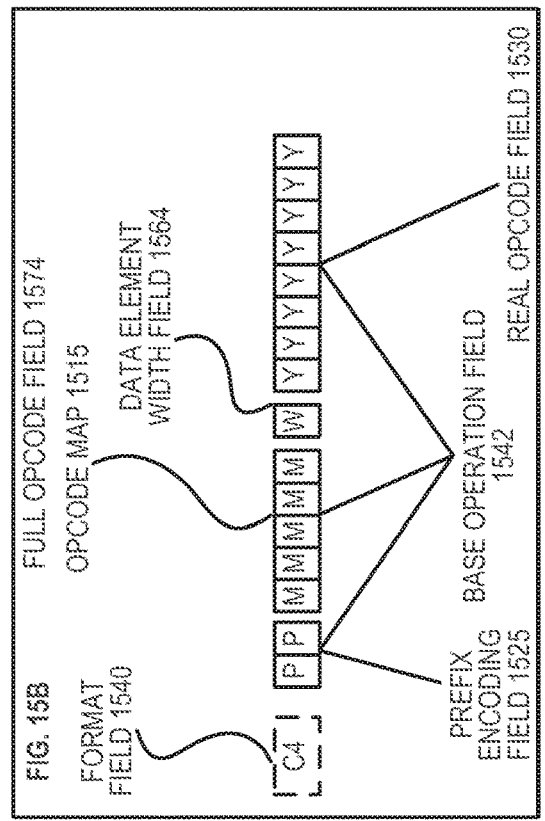

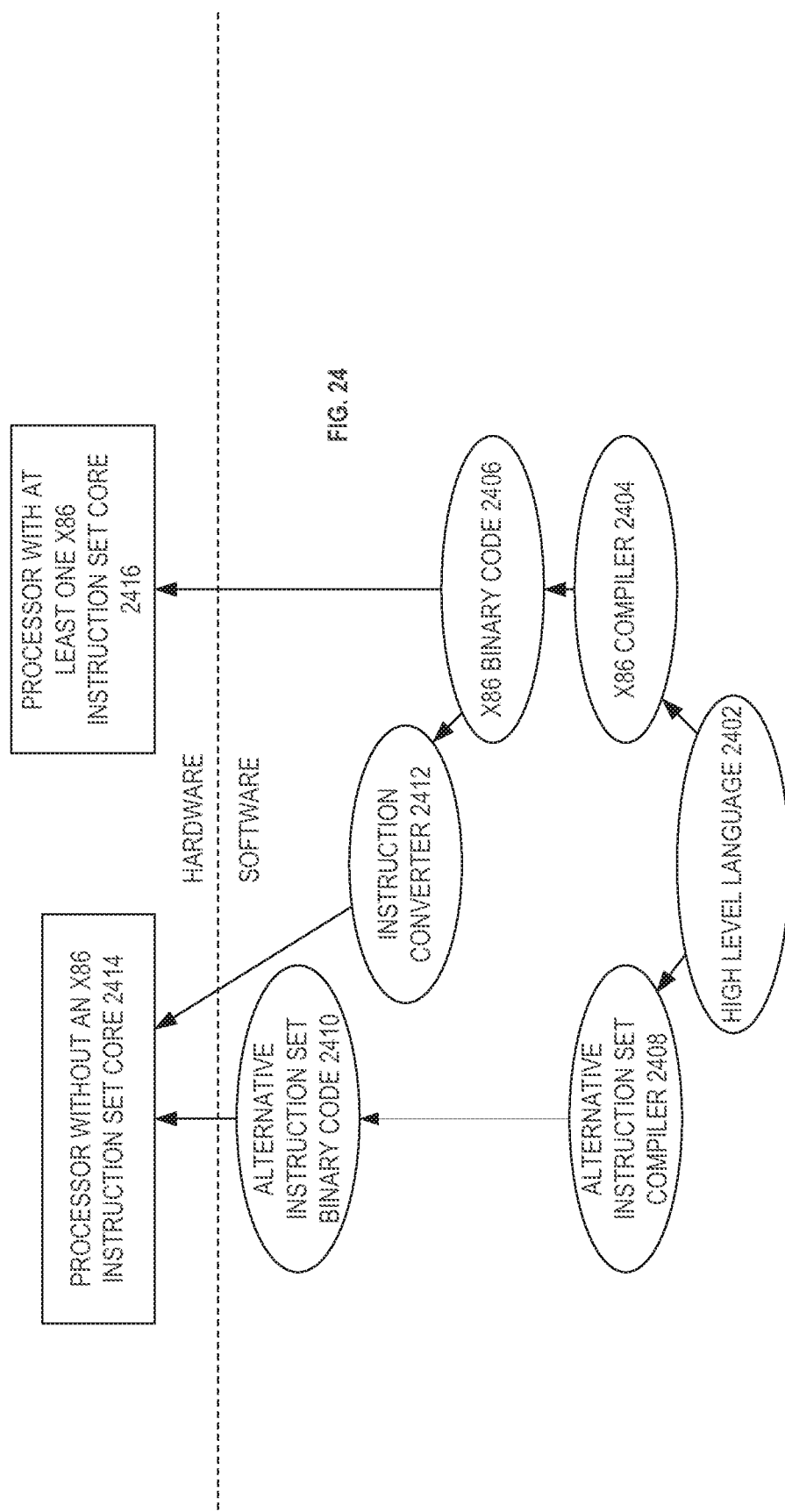

INSTRUCTIONS PROCESSORS, METHODS, AND SYSTEMS TO PROCESS SECURE HASH ALGORITHMS

CROSS-REFERENCE TO RELATED APPLICATION

The present application is a continuation of U.S. patent application Ser. No. 15/401,877 filed on Jan. 9, 2017, titled "INSTRUCTIONS PROCESSORS, METHODS, AND SYSTEMS TO PROCESS SECURE HASH ALGORITHMS," which is a continuation of U.S. patent application Ser. No. 15/011,902 filed on Feb. 1, 2016, titled "INSTRUCTIONS PROCESSORS, METHODS, AND SYSTEMS TO PROCESS SECURE HASH ALGORITHMS," which is a continuation of U.S. patent application Ser. No. 13/729,502 filed on Dec. 28, 2012, which are hereby incorporated herein by reference in its entirety.

BACKGROUND

Field

Embodiments relate to instruction processing apparatus. In particular, embodiments relate to instruction processing apparatus and instructions to process secure hash algorithms.

Background Information

Secure Hash Standard (SHS) (FIPS PUB 180-3), a Federal Information Processing Standards Publication, was published by the National Institute of Standards and Technology, in October, 2008. The SHS standard specifies secure hash algorithms SHA-224, SHA-256, SHA-384, and SHA-512. These four has algorithms are also collectively referred to herein as SHA2 has algorithms, SHA2 algorithms, SHA2 hashes, or the like.

These SHA2 hash algorithms allow computing a message digest representing a condensed representation of input data referred to as a message. When a message with a length less than 2^64 bits (for SHA-224 and SHA-256) or less than 2^128 bits (for SHA-384 and SHA-512) is input to the hash algorithm, a result called a message digest is output. The message digest is also sometimes referred to as a digest or a hash. The message digest is 224-bits for SHA-224, 256-bits for SHA-256, 384-bits for SHA-384, or 512-bits for SHA-512. SHA-224 and SHA-256 are based on a 32-bit word length. SHA-384 and SHA-512 are based on a 64-bit word length.

The hash algorithms specified in this Standard are called secure because, for a given algorithm, it is considered computationally infeasible 1) to find a message that corresponds to a given message digest, or 2) to find two different messages that produce the same message digest. This means that any change to a message will, with a very high probability, result in a different message digest.

The SHA2 algorithms are widely used in electronic devices for authentication, verification, identification, integrity checking, security, or other purposes. They may be used for various different purposes. One common use of the SHA2 algorithms is to verify the integrity of and/or detected changes to messages. For example, an initial message digest may be generated for a message, and then later another message digest may be regenerated for the message and should be the same as the initial message digest assuming the message itself has not been changed. Other examples of applications of secure hash functions include, but are not limited to, generating digital signatures, message authentication codes, verifying the integrity of files or messages, identifying files or data, and pseudorandom generation and key derivation.

FIG. 1 illustrates details of a single round of an SHA2 algorithm 100. A total of sixty-four rounds similar to the round shown may be used to compute the final message digest. Eight state words $a_i$, $b_i$, $c_i$, $d_i$, $e_i$, $f_i$, $g_i$, and $h_i$ 101 are input to the round. The eight state words are also referred to in the standard as the eight working variables. For SHA-224 and SHA-256 each of these state words are 32-bits. For SHA-384 and SHA-512 each of these state words are 64-bits. Also input to the round are a message input to the current round (i.e., W(i)) 102 and a constant input to the current round (i.e., K(i)) 103. A set of SHA2 operations 104 are performed for each round. The set of operations includes a number of modulo additions (shown by the boxes with plus signs inside), and evaluation of functions known as Ch, $\Sigma_1$, Maj, and $\Sigma_0$. There is also a remapping of the state words. The output of the round is eight updated state words $a_{i+1}$, $b_{i+1}$, $c_{i+1}$, $d_{i+1}$, $e_{i+1}$, $f_{i+1}$, $g_{i+1}$, and $h_{i+1}$ 105.

The set of operations for each of the sixty-four rounds include the following operations:

$\Sigma_0(a)=(a$ ROTR 2) XOR ($a$ ROTR 13) XOR ($a$ ROTR 22)

$\Sigma_1(a)=(a$ ROTR 6) XOR ($a$ ROTR 11) XOR ($a$ ROTR 25)

Maj($a$, $b$, $c$)=($a$ AND $b$) XOR ($a$ AND $c$) XOR ($b$ AND $c$)

$T_1=h+\Sigma_1(e)+$Ch($e$, $f$, $g$)$+K_i+W_i$ $T_2=\Sigma_0(a)+$Maj($a$, $b$, $c$)

$h=g$ $g=f$ $f=e$ $e=d+T_1$ $d=c$ $c=b$ $b=a$ $a=T_1+T_2$

In the above, "ROTR" designates a bitwise right rotate operation by the number of bits its right, "XOR" designates a logical exclusive OR operation, "AND" designates a logical AND operation, "NOT" designates a logical NOT operation. The rotation amounts are specific for SHA-256. Other SHA2 algorithms use different shift and rotate amounts.

As can be seen, each round of the SHA2 algorithms involves a large number of operations. In addition, generating the message digest involves sixty-four of such rounds. One significant challenge is that conventionally implementing the SHA2 algorithms involves executing a large number of instructions on a processor. Commonly, each round of the SHA2 algorithms may take from several to many instructions. For example, in one possible implementation, within a round separate instructions may be used to perform each of the rotations, logical AND, XOR, and NOT operations, additions, etc. This, compounded with the fact that there are sixty-four rounds, may tend to make the implementation of the SHA2 algorithms very computationally intensive and to take a significant amount of time.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 7A is a block diagram of an operation performed by a first embodiment of a SHA2 input instruction.

FIG. 8B is a block diagram of an operation performed by an embodiment of an SHA2 two round low update instruction.

FIG. 8C is a block diagram of an operation performed by an embodiment of an SHA2 two round high update instruction.

FIG. 9 is a block diagram of an operation performed by an embodiment of an SHA2 128-bit two round instruction.

FIG. 10 is a block diagram of an operation performed by an embodiment of an SHA2 256-bit two round instruction.

FIG. 11 is a block diagram of an operation performed by an embodiment of an SHA2 128-bit four round instruction.

FIG. 13A-C are block diagrams of a suitable instruction formats.

FIG. 15A illustrates an exemplary AVX instruction format including a VEX prefix, real opcode field, Mod R/M byte, SIB byte, displacement field, and IMM8.

FIG. 15B illustrates which fields from FIG. 15A make up a full opcode field and a base operation field.

FIG. 15C illustrates which fields from FIG. 15A make up a register index field 1544.

FIG. 24 is a block diagram contrasting the use of a software instruction converter to convert binary instructions in a source instruction set to binary instructions in a target instruction set according to embodiments of the invention.

DETAILED DESCRIPTION

Disclosed herein are instructions that are useful for performing SHA2 hash algorithms (e.g., SHA-224, SHA-256, SHA-384, and SHA-512), processors to execute the instructions, methods performed by the processors when processing or executing the instructions, and systems incorporating one or more processors to process or execute the instructions. In the following description, numerous specific details are set forth (e.g., specific instruction functionalities, data formats, data arrangements within registers, instruction formats, processor configurations, execution logic, microarchitectural details, sequences of operations, and the like). However, it is understood that embodiments of the invention may be practiced without these specific details. In other instances, well-known circuits, structures and techniques have not been shown in detail in order not to obscure the understanding of this description.

Figure 1:
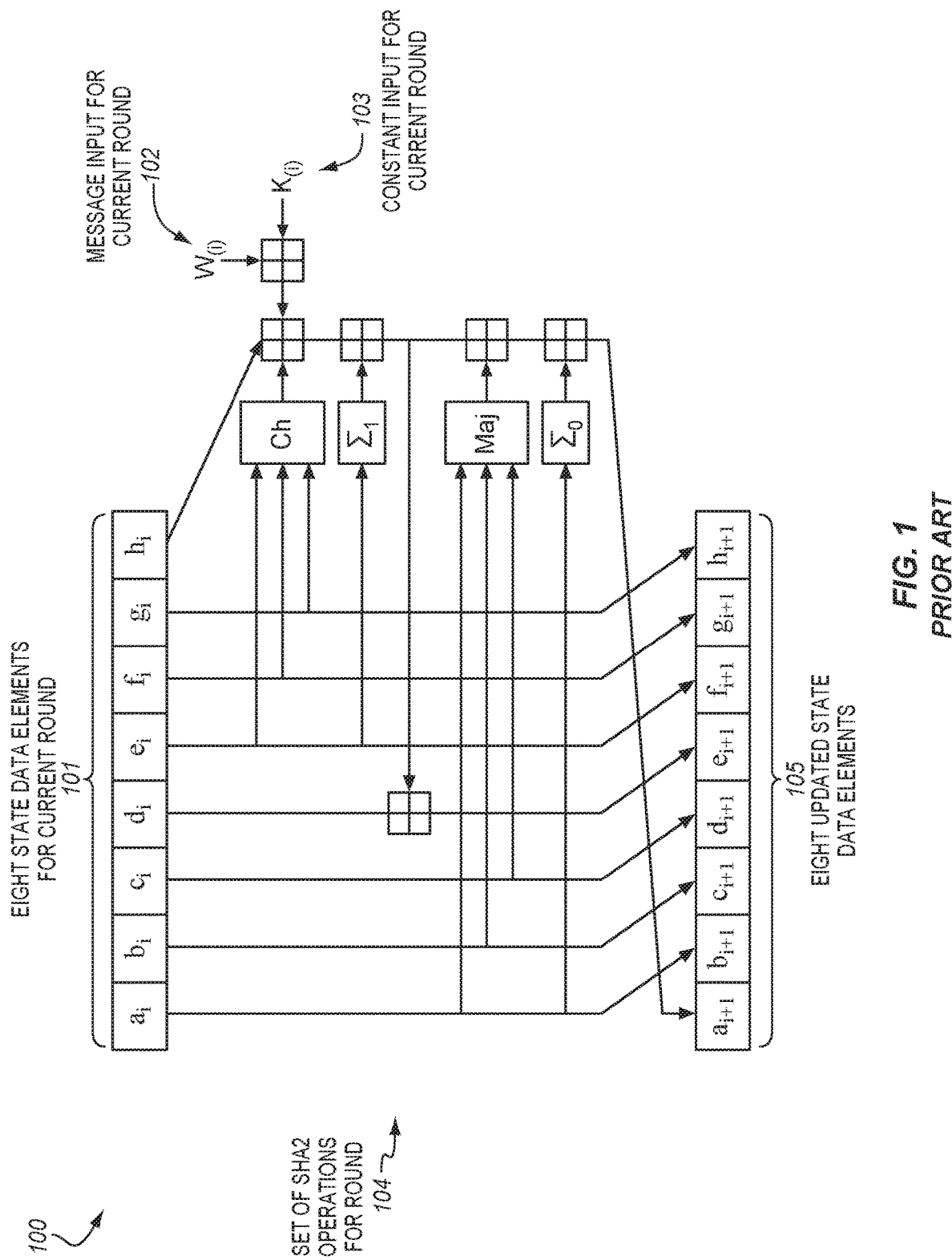
FIG. 1 illustrates details of a single round of a Secure Hash Algorithm 2 (SHA2) hash algorithm.
Figure 2:
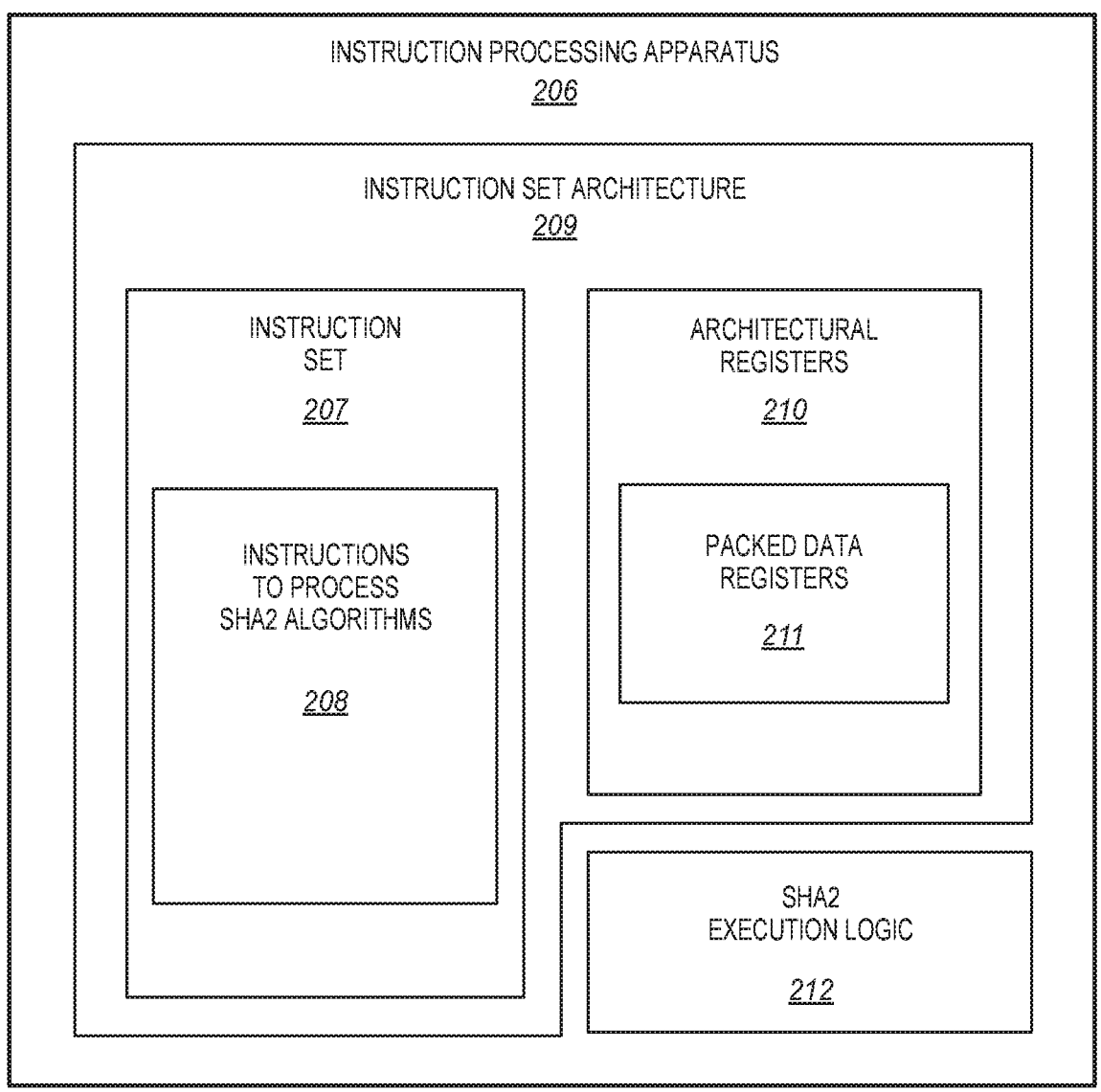
FIG. 2 is a block diagram of an instruction processing apparatus having an instruction set that includes one or more instructions that are useful to perform one or more SHA2 algorithms.

FIG. 2 is a block diagram of an example embodiment of a processor or other instruction processing apparatus 206 having an instruction set 207 that includes one or more instructions 208 that are useful to perform one or more SHA2 algorithms. The processor may be any of various complex instruction set computing (CISC) processors, various reduced instruction set computing (RISC) processors, various very long instruction word (VLIW) processors, various hybrids thereof, or other types of processors entirely. In some embodiments, the processor may be a general-purpose processor (e.g., of the type used in desktop, laptop, server, and like computers). Alternatively, the processor may be a special-purpose processor. Examples of suitable special-purpose processors include, but are not limited to, cryptographic processors, communications processors, network processors, digital signal processors (DSPs), cryptographic co-processors, embedded processors, graphics processors, and controllers (e.g., microcontrollers), to name just a few examples.

The processor or apparatus has an instruction set architecture (ISA) 209. The ISA represents a part of the architecture of the processor related to programming and commonly includes the native instructions, architectural registers, data types, addressing modes, memory architecture, interrupt and exception handling, and external input and output (I/O) of the processor. The ISA is distinguished from the microarchitecture, which generally represents the particular processor design techniques selected to implement the ISA.

The ISA includes an instruction set 207. The instructions of the instruction set represent macroinstructions (e.g., instructions provided to the processor for execution), as opposed to microinstructions or micro-ops (e.g., those which result from a decoder of the processor decoding macroinstructions). The instruction set includes one or more instructions 208 that are each useful to process perform one or more SHA2 algorithms.

The ISA also includes architecturally-visible registers 210. The architectural registers generally represent on-die processor storage locations. The architectural registers may also be referred to herein simply as registers. The phrases architectural register, register file, and register are used herein to refer to registers that are visible to the software and/or programmer (e.g., software-visible) and/or the registers that are specified by macroinstructions to identify operands. These registers are contrasted to non-architectural or non-architecturally visible registers in a given microarchitecture (e.g., temporary registers used by instructions, reorder buffers, retirement registers, etc.). The illustrated registers include packed data registers 211 that are each operable to store packed, vector, or single instruction multiple data (SIMD) data. The instruction(s) to process the SHA2 algorithm(s) 208 may indicate source data in, and indicate destinations where result data is to be stored in, the packed data registers.

The processor or apparatus also includes SHA2 execution logic 212. The SHA2 execution logic may include an execution unit, functional unit, circuit responsive to an instruction, or the like. The SHA2 execution logic is operable to execute or process the instruction(s) 208.

Figure 3:
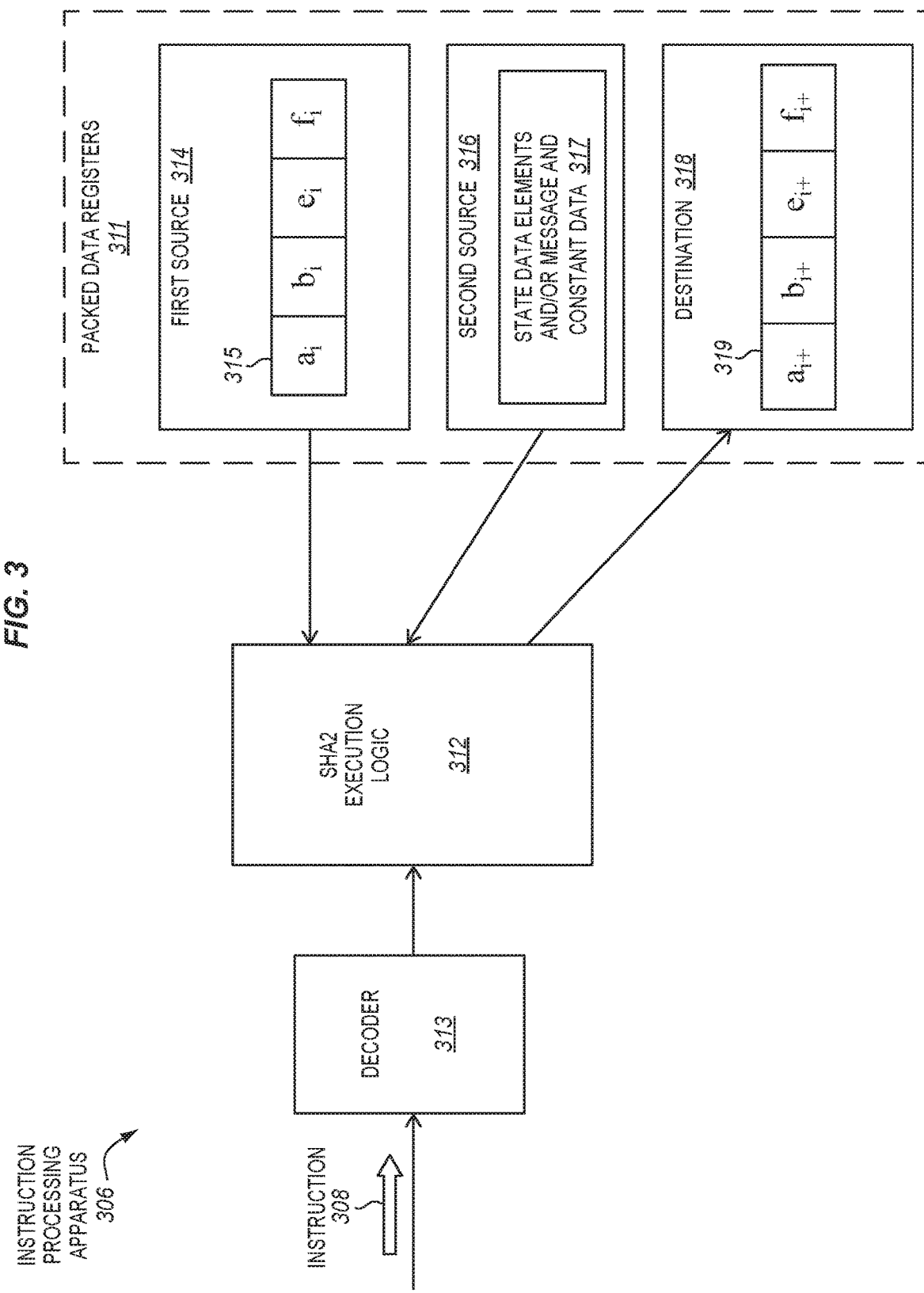
FIG. 3 is a block diagram of an embodiment of an instruction processing apparatus having a SHA2 execution logic that is operable to execute at least one embodiment of an instruction useful to process an SHA2 secure hash algorithm.

FIG. 3 is a block diagram of an example embodiment of a processor or other instruction processing apparatus 306 having a SHA2 execution logic 312 that is operable to execute at least one embodiment of an instruction 308 useful to process an SHA2 secure hash algorithm. In some embodiments, the instruction processing apparatus may be a processor and/or may be included in a processor. In some embodiments, the instruction processing apparatus may be included in the apparatus of FIG. 2, or else the instruction processing apparatus 306 may be included in a similar or different apparatus.

The apparatus 306 may receive the instruction 308. For example, the instruction may be received from an instruction fetch unit, an instruction queue, or a memory. The instruction may represent a machine instruction, macroinstruction, or control signal that is recognized by the apparatus and that controls the apparatus to perform particular operations. The instruction may explicitly specify (e.g., through bits or one or more fields) or otherwise indicate (e.g., implicitly indicate) a first source 314. The instruction may also explicitly specify or otherwise indicate a second source 316. The instruction may also explicitly specify or otherwise indicate a destination 318 (e.g., a destination storage location) where a result of the instruction is to be stored. In some embodiments, one of the first and second sources may be reused as the destination (e.g., a source/destination field of the instruction may specify a register used as a source and a destination).

The illustrated apparatus includes an instruction decode unit or decoder 313. The decoder may receive and decode higher-level machine instructions or macroinstructions and output one or more lower-level micro-operations, microcode entry points, microinstructions, or other lower-level instructions or control signals that reflect and/or are derived from the original higher-level instruction. The one or more lower-level instructions or control signals may implement the operation of the higher-level instruction through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms used to implement decoders known in the art.

In other embodiments, instead of having the decoder 313, an instruction emulator, translator, morpher, interpreter, or other instruction conversion logic may be used. Various different types of instruction conversion logic are known in the arts and may be implemented in software, hardware, firmware, or a combination thereof. The instruction conversion logic may receive the instruction, emulate, translate, morph, interpret, or otherwise convert the received instruction into one or more corresponding derived instructions or control signals. In still other embodiments, both instruction conversion logic and a decoder may be used.

The apparatus also includes a set of architectural packed data registers 311. The packed data registers may be implemented in different ways in different microarchitectures using well-known techniques, and are not limited to any particular type of circuit. Various different types of registers are suitable. Examples of suitable types of registers include, but are not limited to, dedicated physical registers, dynamically allocated physical registers using register renaming, and combinations thereof. As shown, in some embodiments, the first source 314, the second source 316, and the destination 318, may each be one of the packed data registers. Alternatively, memory locations or other storage locations suitable may be used for one or more of these The SHA2 execution logic 312 is coupled with the packed data registers 311 and with the decoder 313. The SHA2 execution logic may receive from the decoder one or more micro-operations, micro-code entry points, microinstructions, other instructions, or other control signals, which reflect, or are derived from, the instruction 308. The SHA2 execution logic may be operable, in response to and/or as a result of the instruction 308 to store a packed data result 319 in the destination 318 specified or otherwise indicated by the instruction. The SHA2 execution logic and/or the apparatus may include specific or particular logic (e.g., circuitry or other hardware potentially combined with firmware and/or software) operable to execute and/or process the instruction, and store the result in response to the instruction (e.g., in response to one or more microinstructions or other control signals derived from the instruction).

In some embodiments, the first source 314 may include a first packed data 315 including state data elements $a_i$, $b_i$, $e_i$, and $f_i$ for a current round (i) of an SHA2 hash algorithm, and the second source 316 may include a second packed data (e.g., in various embodiments state data elements and/or message and constant data). In some embodiments, the result 319 may include updated state data elements $a_{i+}$, $b_{i+}$, $e_{i+}$, and $f_{i+}$ that have been updated from the corresponding state data elements $a_i$, $b_i$, $e_i$, and $f_i$ of the first source 314 by at least one round of the SHA2 hash algorithm. For example, the updated state data element $a_i$ may represent the corresponding starting state data element $a_i$ for the current round updated by one round of the SHA2 hash algorithm, the updated state data element $b_{i+}$ may represent the corresponding starting state data element $b_i$ updated by one round of the SHA2 hash algorithm, and so on.

In some embodiments, the first packed data 315 may have a width in bits that is less than a combined width in bits of the eight state data elements (i.e., $a_i$, $b_i$, $e_i$, and $f_i$ and the other four $c_i$, $d_i$, $g_i$, and $h_i$) of the SHA2 hash algorithm. In some embodiments, the width in bits of the first packed data may be about half the combined width in bits of the eight state data elements of the SHA2 hash algorithm. For example, in the case of SHA-256, each of the eight state data elements may be 32-bits and the combined width in bits of the eight state data elements may be 256-bits, while the first packed data may have a width of only 128-bits (e.g., be stored in a 128-bit register) and be able to hold only four of the eight 32-bit state data elements (e.g., $a_i$, $b_i$, $e_i$, and $f_i$). As another example, in the case of SHA-512, each of the eight state data elements may be 64-bits and the combined width in bits of the eight state data elements may be 512-bits, while the first packed data may have a width of only 256-bits (e.g., be stored in a 256-bit register) and be able to hold only four of the eight 64-bit state data elements.

In some embodiments, the result may include updated state data elements $a_{i+2}$, $b_{i+2}$, $e_{i+2}$, and $f_{i+2}$ that have been updated from the corresponding state data elements $a_i$, $b_i$, $e_i$, and $f_i$ of the first source by two rounds of the SHA2 hash algorithm. In some embodiments, the result may include updated state data elements $a_{i+4}$, $b_{i+4}$, $e_{i+4}$, and $f_{i+4}$ that have been updated from the corresponding state data elements $a_i$, $b_i$, $e_i$, and $f_i$ of the first source by four rounds of the SHA2 hash algorithm. Specific examples of these instructions will be described further below.

In some embodiments, the instruction may specify two and only two sources (i.e., not have a third source). In other embodiments, the instruction may indicate a third source in addition to the first and second sources (e.g., implicitly indicate or explicitly specify the third source). Specific examples of these instructions will be described further below.

As will be explained further below, in some embodiments, some of the processing of the SHA2 round may be implemented outside of the confines of the execution of the instruction. For example, as will explained further below, in some embodiments the calculation of X and Y may be performed by another instruction. As another example, in some embodiments, calculation of message data and/or addition of messages and constants may be performed outside of the round. In some embodiments, the execution of the instruction may include performing the operations of the $\Sigma_0$ function (e.g., ($a_i$ ROTR 2) XOR ($a_i$ ROTR 13) XOR ($a_i$ ROTR 22) for SHA-256) and/or the Maj function (e.g., ($a_i$ AND $b_i$) XOR ($a_i$ AND $c_i$) XOR ($a_i$ AND $c_i$) for SHA-256).

Advantageously, in some embodiments, a single instruction may be used to update four of the state data elements by at least one round of the SHA2 algorithm. This may help to significantly improve the efficiency and/or speed of implementing the SHA2 algorithm.

To avoid obscuring the description, a relatively simple apparatus 306 has been shown and described. In other embodiments, the apparatus may optionally include other components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. Embodiments may have multiple cores, logical processors, or execution engines. An SHA2 execution logic operable to execute an embodiment of at least one instruction disclosed herein may be included in at least one of the cores, logical processors, or execution engines. There are literally numerous different combinations/configurations of such components in processors and the scope of the invention is not limited to any such combination/configuration.

Figure 4:
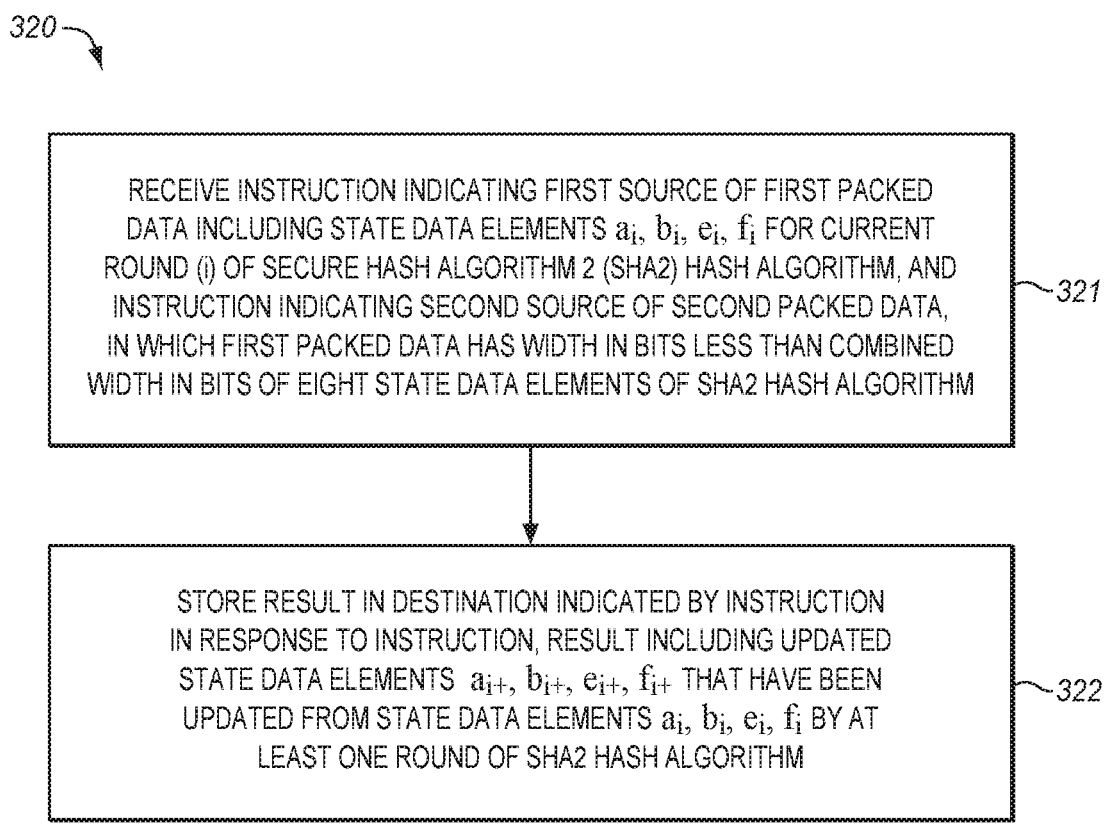
FIG. 4 is a block flow diagram of an embodiment of a method of processing an instruction useful for the SHA2 secure hash algorithm.

FIG. 4 is a block flow diagram of an embodiment of a method 320 of processing an instruction useful for the SHA2 secure hash algorithm. In various embodiments, the method may be performed by a general-purpose processor, a special-purpose processor (e.g., a cryptographic co-processor or core), or other type of instruction processing apparatus. In some embodiments, the method 320 may be performed by the apparatus of either FIG. 2 and/or FIG. 3, or a similar apparatus. Alternatively, the method 320 may be performed by a different apparatus. The components, features, and specific optional details described herein for the apparatus also optionally apply to the method 320 which may in embodiments be performed by and/or with the apparatus. Moreover, the apparatus of either FIG. 2 and/or FIG. 3 may perform the same, similar or different operations and methods than those of FIG. 4.

The method includes receiving the instruction, at block 321. In various aspects, the instruction may be received at a processor, an instruction processing apparatus, or a portion thereof (e.g., a decoder, instruction converter, etc.) from an off-processor source (e.g., from a main memory, a disc, or a bus or interconnect), or from an on-processor source (e.g., from an instruction cache).

In some embodiments, the instruction indicates a first source of a first packed data including state data elements $a_i$, $b_i$, $e_i$, and $f_i$ for a current round (i) of the SHA2 hash algorithm. The instruction also indicates a second source of a second packed data. In some embodiments, the first packed data may have a width in bits that is less than a combined width in bits of the eight state data elements of the SHA2 hash algorithm.

A result is stored in a destination that is specified or otherwise indicated by the instruction in response to, as a result of, and/or as specified by the instruction, at block 322. In some embodiments, the result may include updated state data elements $a_{i+}$, $b_{i+}$, $e_{i+}$, and $f_{i+}$ that have been updated from the corresponding state data elements $a_i$, $b_i$, $e_i$, and $f_i$ by at least one round of the SHA2 hash algorithm.

The illustrated method includes operations that are architecturally visible (e.g., visible from a software perspective). In other embodiments, the method may optionally include one or more microarchitectural operations. For example, the instructions may be fetched, decoded (or otherwise converted) into one or more instructions or control signals. The source operands may be accessed and/or received. An execution unit or execution logic may be enabled to perform the operation specified by the instruction, and may perform the operation (e.g., microarchitectural operations to implement the operations of the instructions may be performed). For example, exclusive OR operations, rotate operations, addition operations, and the like may be performed, as described elsewhere herein. Different microarchitectural ways of performing the operation are contemplated. Other method embodiments may include one or more such non-architecturally visible operations.

Figure 5:
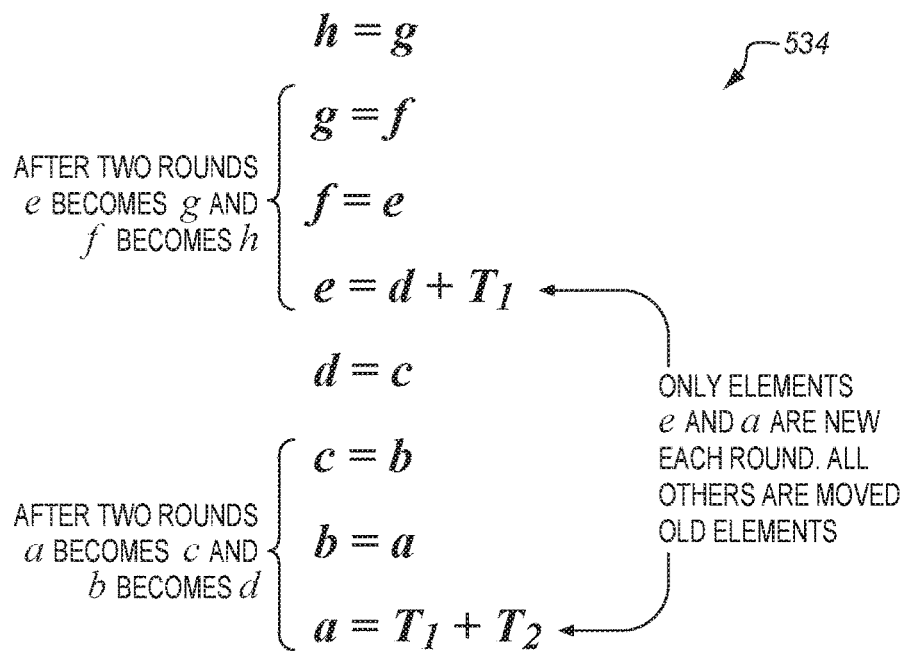
FIG. 5 illustrates a portion of a round of an SHA2 algorithm.

FIG. 5 illustrates a portion of a round 534 of an SHA2 algorithm where state words or elements a-h are updated. A property of the SHA2 algorithms is that within each round only the values of the state words a and e are new and not predetermined. The state words a and e are determined each round based on the functions of the SHA2 algorithm, the message and constant inputs, etc. In the illustration, these functions are incorporated in $T_1$ and $T_2$. All of the other state words have old or predetermined values that simply have been moved from one of the other state elements. For example, the value of state element after the round is equal to the value of the state element $b_i$ of the current round, etc.). As a result, the value of state element $a_i$ of the current round after two rounds of the SHA2 algorithm becomes the value of the state element $c_{i+2}$, the value of $b_i$ after two rounds becomes the value of $d_{i+2}$, the value of $e_i$ after two rounds becomes the value of $g_{i+2}$, and the value of $f_i$ after two rounds becomes the value of $h_{i+2}$.

Figure 6:
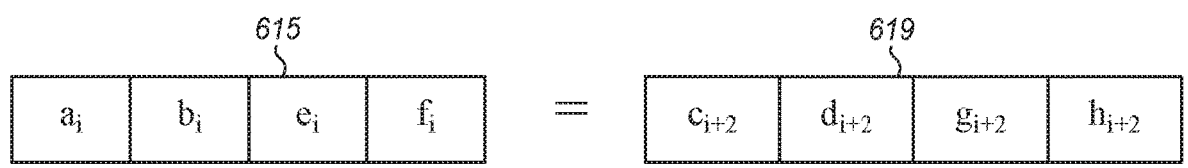
FIG. 6 is a block diagram of an embodiment of a subset of four state words or elements $a_i$ $b_i$ $e_i$ and f in a register.

FIG. 6 is a block diagram of an embodiment of a useful subset of four state words or elements $a_i$, $b_i$, $e_i$, and $f_i$ in a register 615. The state words or elements may be stored in the order shown, or alternatively in various different orders. A useful consequence and advantage of storing these four state words in the register is that after two rounds of the SHA2 algorithm they are equal to the four complementary state elements $c_{i+2}$, $d_{i+2}$, $g_{i+2}$, and $h_{i+2}$. In some embodiments, rather than needing to calculate any of $c_{i+2}$, $d_{i+2}$, $g_{i+2}$, and $h_{i+2}$, the values of the elements $a_i$, $e_i$, and $f_i$ the register 615 may simply be moved, copied, or otherwise stored in the register 619.

Figure 7B:
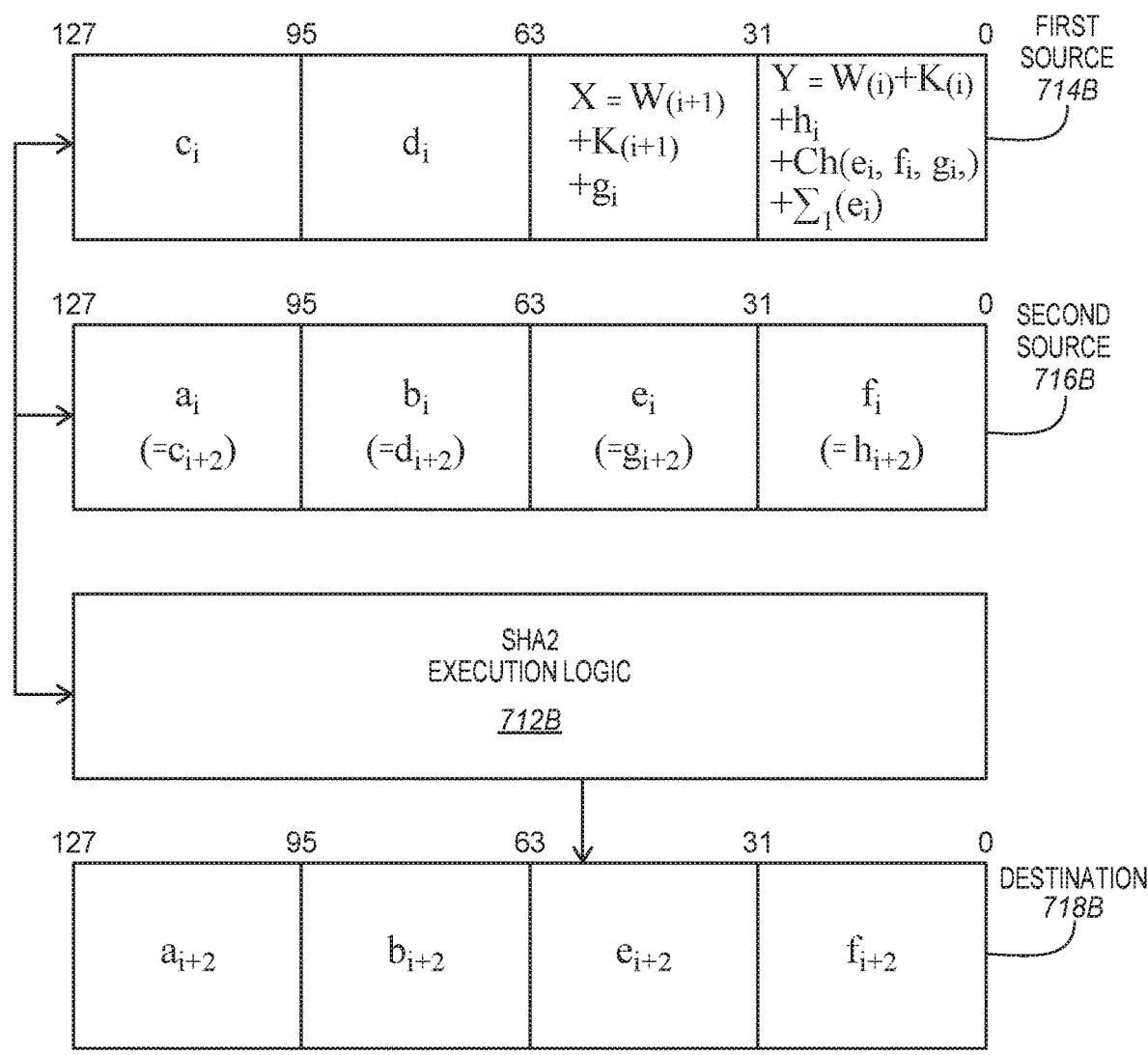
FIG. 7B is a block diagram of an operation performed by an embodiment of an SHA2 two round instruction.

FIGS. 7A-B illustrate operations of a complementary pair of instructions that are operable to generate updated state data elements $a_{i+2}$, $b_{i+2}$, $e_{i+2}$, and $f_{i+2}$, which have been updated from the state data elements $a_i$, $b_i$, $e_i$, and $f_i$ by two rounds of the SHA2 hash algorithm. In some embodiments, the instructions use only two source operands (e.g., are useful for ISA or microarchitectures that allow only two source operands to be specified for these instructions). The instructions utilize 128-bit packed data and/or registers having a width in bits (i.e., 128-bits) that is half a combined width in bits of the eight 32-bit state data elements of the SHA2 hash algorithm (i.e., 256-bits). Although the full width of the state elements would fit in two such registers, the message and constant inputs of the SHA2 algorithm also need to be introduced. The pair of instructions provide one instruction (i.e., that of FIG. 7A) to introduce the message and constant inputs and another instruction (i.e., that of FIG. 7B) to update the state elements. In other embodiments, an analogous pair of instructions may be used for SHA2 algorithms having combined state of 512-bits using 256-bit packed data and/or registers.

FIG. 7A is a block diagram of an operation 740 performed by an embodiment of a SHA2 input instruction (SHA2_in). The instruction specifies or otherwise indicates a first source 714A, specifies or otherwise indicates a second source 716A, and specifies or otherwise indicates a destination 718A. In some embodiments, the first source, second source, and destination may be 128-bit registers or other storage locations. The first source has a first 128-bit packed data including four 32-bit state data elements $c_i$, $d_i$, $g_i$, and $h_i$. For example, in the illustration $h_i$ is stored in bits [31:0], $g_i$ is stored in bits [63:32], $d_i$ is stored in bits [95:64], and $c_i$ is stored in bits [127:96], although this particular order is not required.

The second source has a second 128-bit packed data including two 32-bit state data elements $e_i$ and $f_i$. In the illustrated embodiment, $e_i$ is stored in bits [127:96] and $f_i$ is stored in bits [64:95], although this particular order is not required. The second source also has two 32-bit data elements representing message and constant inputs for two rounds of the SHA2 algorithm (i.e., the current round and one round after the current round). In the illustrated embodiment, a first data element representing a message input for the current round W(i) added to a constant input for the current round K(i) is stored in [31:0], and a second data element representing a message input for one round after the current round W(i+1) added to a constant input for one round after the current round K(i+1) is stored in [63:32]. In another embodiment, each of W(i), W(i+1), K(i), and K(i+1) may be stored separately in four data elements of the second packed data.

SHA2 execution logic 712A is operable to store a 128-bit packed data result in the destination in response to the instruction. In some embodiments, the result includes four result data elements. In the illustrated embodiment, a first result data element (Y) is stored in bits [31:0]. The first result data element (Y) represents a sum of the message input for the current round W(i) added to the constant input for the current round K(i) (i.e., W(i)+K(i)) added to the state data element $h_i$ for the current round added to an evaluation of the Ch function with the state elements $e_i$, $f_i$, and $g_i$ for the current round (i.e., Ch($e_i$, $f_i$, $g_i$)) added to an evaluation of the sigma1 function with the state element $e_i$ for the current round (i.e., $\Sigma_1(e_i)$).

A second result data element (X) is stored in bits [63:32]. The second result data element (X) represents a sum of the message input for one round after the current round W(i+1) added to the constant input for one round after the current round K(i+1) (i.e., W(i+1) plus K(i+1)) added to the state data element $g_i$ for the current round. The X and Y elements include the message and constant inputs for the two rounds as well as the Y parameter incorporating the evaluation of the Ch and sigma1 functions. The X and Y elements are not defined in the SHA2 algorithms and instead are new groupings of these parameters for the instructions disclosed herein and are arbitrarily named.

The result also includes the state data element $d_i$ for the current round stored in bits [95:64] and the state data element $c_i$ for the current round stored in bits [127:96]. This particular order in the destination is not required. In some embodiments, the first source is reused as the destination and the data elements $c_i$, $d_i$, X, Y overwrite the data elements $c_i$, $d_i$, $g_i$, and $h_i$. The state elements $g_i$ and $h_i$ are no longer needed once the X and Y elements have been determined. In some embodiments, this may allow the state elements $a_{i+2}$, $b_{i+2}$, $e_{i+2}$, and $f_{i+2}$ after two rounds to be calculated with a single instruction having only two source operands (e.g., as shown in FIG. 7B).

FIG. 7B is a block diagram of an operation 730B performed by an embodiment of an SHA2 two round instruction (SHA2_RNDS2). The instruction specifies or otherwise indicates a first source 714B, specifies or otherwise indicates a second source 716B, and specifies or otherwise indicates a destination 718B. In some embodiments, the first source, second source, and destination may be 128-bit registers or other storage locations.

The first source has a first 128-bit packed data including four 32-bit data elements. In some embodiments, the first 128-bit packed data may be equal or identical to the result of the SHA2 input instruction of FIG. 7A. In some embodiments, the destination 718A of the SHA2 input instruction may be indicated as the first source 714B of the SHA2 two round instruction. As shown in the illustration, the first source includes a first data element (Y) is stored in bits [31:0]. The first data element (Y) represents a sum of the message input for the current round W(i) added to the constant input for the current round K(i) (i.e., W(i)+K(i)) added to the state data element $h_i$ for the current round added to an evaluation of the Ch function with the state elements $e_i$, $f_i$, and $g_i$ for the current round (i.e., Ch($e_i$, $f_i$, $g_i$) added to an evaluation of the sigma1 function with the state element $e_i$ for the current round (i.e., $\Sigma_1(e_i)$). A second data element (X) is stored in bits [63:32]. The second data element (X) represents a sum of the message input for one round after the current round W(i+1) added to the constant input for one round after the current round K(i+1) (i.e., W(i+1) plus K(i+1)) added to the state data element $g_i$ for the current round. The packed data also includes the state data element $d_i$ for the current round stored in bits [95:64] and the state data element $c_i$ for the current round stored in bits [127:96]. This particular order in the source is not required.

The second source has a second 128-bit packed data including four 32-bit state data elements $a_i$, $b_i$, $e_i$ and $f_i$. In the illustrated embodiment, $a_i$ is stored in bits [127:96], $b_i$ is stored in bits [95:64], $e_i$ is stored in bits [63:32], and $f_i$ is stored in bits [31:0], although this particular order is not required.

SHA2 execution logic 712B is operable to store a 128-bit packed data result in the destination 718B in response to the instruction. In some embodiments, the result includes four updated state data elements $a_{i+2}$, $b_{i+2}$, $e_{i+2}$, and $f_{i+2}$ that have been updated from the corresponding state data elements $a_i$, $b_i$, $e_i$, and $f_i$, respectively, by two rounds of the SHA2 hash algorithm. In the illustrated embodiment, $a_{i+2}$ is stored in bits [127:96], $b_{i+2}$ is stored in bits [95:64], $e_{i+2}$ is stored in bits [63:32], and $f_{i+2}$ is stored in bits [31:0], although this particular order is not required. Other embodiments may update the state elements by a single round instead of two rounds, or by more than two rounds.

As discussed above, the current round state variables $a_i$, $b_i$, $e_i$ and $f_i$ are equivalent to the round i+2 state variables $c_{i+2}$, $d_{i+2}$, $g_{i+2}$, and $h_{i+2}$, respectively. The current round state variables $a_i$, $b_i$, $e_i$ and $f_i$ are stored in the second source. Advantageously, the round i+2 state variables $c_{i+2}$, $d_{i+2}$, $g_{i+2}$, and $h_{i+2}$ do not need to be calculated separately. Rather, the current round state variables $a_i$, $b_i$, $e_i$ and $f_i$ may merely be reused as the round i+2 state variables $c_{i+2}$, $d_{i+2}$, $g_{i+2}$, and $h_{i+2}$. For example, the current round state variables $a_i$, $b_i$, $e_i$ and $f_i$ in the second source may be combined with the result in the destination to provide the complete set of the eight updated state data elements that have all been updated by two rounds.

Advantageously, these instructions allow updating the values of all eight state elements of the SHA2 algorithm by two rounds by executing two instructions, with the exception of some operations to generate and add the message and constant inputs (e.g., W(i)+K(i)), etc. In some embodiments, both instructions may execute in on the order of about 3 cycles per round, although the scope of the invention is not so limited. The novel arrangement of the state elements $a_i$, $b_i$, $e_i$ and $f_i$ is helpful in this regard. In addition, only two sources need to be specified. Moreover, the registers can be half the combined with of the state elements of the SHA2 algorithm. Use of such smaller registers, and associated execution widths, as opposed to using twice the register and execution width, generally helps to reduce the cost and power consumption of the processors or integrated circuits. This may tend to make implementation of these instructions useful for low cost and/or mobile or battery powered electronic devices.

Listed below is pseudocode, in some embodiments, that may use the SHA2_IN and SHA2_RNDS2 instructions, where WKi=W(i)+K(i):

```
Given: XMM0=abef and XMM1=cdgh
Round i:
MOV          XMM2, XMM0              //XMM2=abef
BLEND        XMM0, mem(WK2,WK1)      //XMM0= WK2,WK1,e,f
SHA2_IN      XMM1, XMM0              //XMM1= cdX1Y1
SHA2_RNDS2   XMM1, XMM2              // XMM1=a2,b2,e2,f2
                                     //XMM0=c2,d2,g2,h2
Round (i+2):
MOV          XMM2, XMM1              //XMM2=a2b2e2f2
BLEND        XMM1, mem(WK4,WK3)      //XMM0=WK4,WK3,e2, f2
SHA2_IN      XMM0, XMM1              //XMM1= c2d2X2Y2
SHA2_RNDS2   XMM0, XMM2              // XMM1=a4,b4,e4,f4
                                     //XMM0=c4,d4,g4,h4
```

Figure 8A:
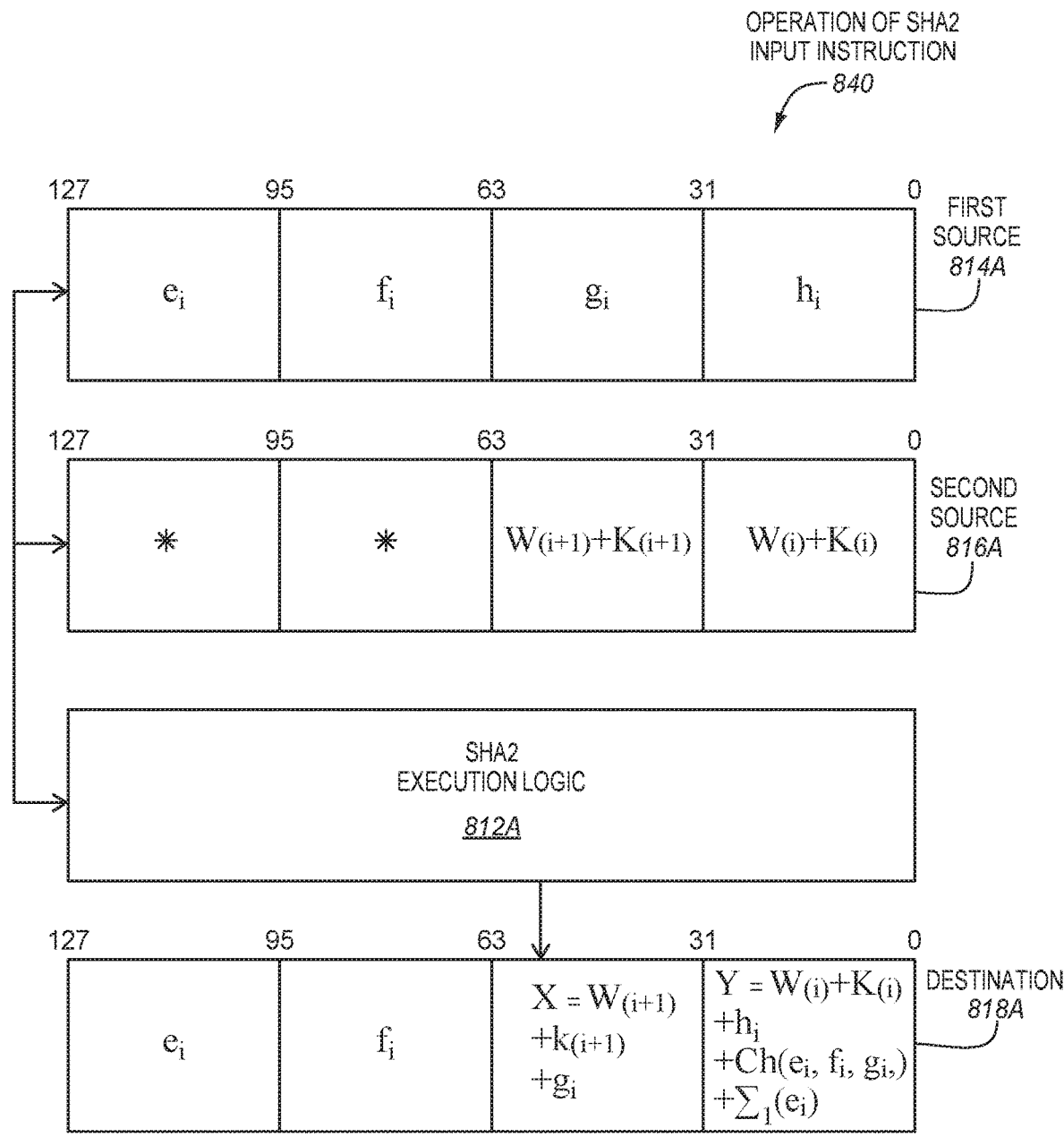
FIG. 8A is a block diagram of an operation performed by a second embodiment of a SHA2 input instruction.

FIGS. 8A-C illustrate operations of a complementary set of three instructions that are operable to generate all eight updated state data elements $a_{i+2}$, $b_{i+2}$, $c_{i+2}$, $d_{i+2}$, $e_{i+2}$, $f_{i+2}$, $g_{i+2}$, and $h_{i+2}$, which have been updated from the state data elements $a_i$, $b_i$, $c_i$, $d_i$, $e_i$, $f_i$, $g_i$, and $h_i$ by two rounds of the SHA2 hash algorithm. Each of the three instructions utilize only two source operands. The instructions utilize 128-bit packed data and/or registers having a width in bits (i.e., 128-bits) that is half a combined width in bits of the eight 32-bit state data elements of the SHA2 hash algorithm (i.e., 256-bits). In other embodiments, an analogous set of three instructions may be used for SHA2 algorithms having combined state of 512-bits using 256-bit packed data and/or registers.

FIG. 8A is a block diagram of an operation 840 performed by an embodiment of a SHA2 input instruction (SHA2_in). The instruction specifies or otherwise indicates a first source 814A, specifies or otherwise indicates a second source 816A, and specifies or otherwise indicates a destination 818A. In some embodiments, the first source, second source, and destination may be 128-bit registers or other storage locations. The first source has a first 128-bit packed data including four 32-bit state data elements $e_i$, $f_i$, $g_i$, and $h_i$. For example, in the illustration $h_i$ is stored in bits [31:0], $g_i$ is stored in bits [63:32], $f_i$ is stored in bits [95:64], and $e_i$ is stored in bits [127:96], although this particular order is not required.

The second source has a second packed data including two 32-bit data elements representing message and constant inputs for two rounds of the SHA2 algorithm (i.e., the current round and one round after the current round). As shown, in some embodiments, the second source and/or second packed data may be 128-bits with half of the bits (e.g., an upper half) being don't care values (*) and the other half of the bits holding the two 32-bit data elements. Alternatively, 64-bit sources and/or packed data may be used. In the illustrated embodiment, a first data element representing a message input for the current round W(i) added to a constant input for the current round K(i) is stored in [31:0], and a second data element representing a message input for one round after the current round W(i+1) added to a constant input for one round after the current round K(i+1) is stored in [63:32]. In another embodiment, each of W(i), W(i+1), K(i), and K(i+1) may be stored separately in four data elements of the second packed data.

SHA2 execution logic 812A is operable to store a 128-bit packed data result in the destination in response to the instruction. In some embodiments, the result includes four result data elements. In the illustrated embodiment, a first result data element (Y) is stored in bits [31:0]. The first result data element (Y) represents a sum of the message input for the current round W(i) added to the constant input for the current round K(i) (i.e., W(i)+K(i)) added to the state data element $h_i$ for the current round added to an evaluation of the Ch function with the state elements $e_i$, $f_i$, and $g_i$ for the current round (i.e., Ch($e_i$, $f_i$, $g_i$) added to an evaluation of the sigma1 function with the state element $e_i$ for the current round (i.e., $\Sigma_1(e_i)$).

A second result data element (X) is stored in bits [63:32]. The second result data element (X) represents a sum of the message input for one round after the current round W(i+1) added to the constant input for one round after the current round K(i+1) (i.e., W(i+1) plus K(i+1)) added to the state data element $g_i$ for the current round. The result also includes the state data element $f_i$ for the current round stored in bits [95:64] and the state data element $e_i$ for the current round stored in bits [127:96]. This particular order in the destination is not required. In some embodiments, the first source is reused as the destination and the data elements $e_i$, $f_i$, X, Y of the result overwrite the data elements $e_i$, $f_i$, $g_i$, and $h_i$ of the first source, although this is not required.

FIG. 8B is a block diagram of an operation 830B performed by an embodiment of an SHA2 two round low update instruction (SHA2_LO). The instruction specifies or otherwise indicates a first source 814B, specifies or otherwise indicates a second source 816B, and specifies or otherwise indicates a destination 818B. In some embodiments, the first source, second source, and destination may be 128-bit registers or other storage locations.

The first source has a first 128-bit packed data including four 32-bit data elements. In some embodiments, the first 128-bit packed data may be equal or identical to the result of the SHA2 input instruction of FIG. 8A. In some embodiments, the destination 818A of the SHA2 input instruction of FIG. 8A may be indicated as the first source 814B of the SHA2 two round low instruction of FIG. 8B. As shown in the illustration, the first source includes a first data element (Y) is stored in bits [31:0]. The first data element (Y) represents a sum of the message input for the current round W(i) added to the constant input for the current round K(i) (i.e., W(i)+K(i)) added to the state data element $h_i$ for the current round added to an evaluation of the Ch function with the state elements $e_i$, $f_i$, and $g_i$ for the current round (i.e., Ch($e_i$, $f_i$, $g_i$) added to an evaluation of the sigma1 function with the state element $e_i$ for the current round (i.e., $\Sigma_1(e_i)$). A second data element (X) is stored in bits [63:32]. The second data element (X) represents a sum of the message input for one round after the current round W(i+1) added to the constant input for one round after the current round K(i+1) (i.e., W(i+1) plus K(i+1)) added to the state data element $g_i$ for the current round. The first source also includes the state data element $f_i$ for the current round stored in bits [95:64] and the state data element $e_i$ for the current round stored in bits [127:96]. This particular order in the first source is not required.

The second source has a second 128-bit packed data including four 32-bit state data elements $a_i$, $b_i$, $c_i$ and $d_i$. In the illustrated embodiment, $a_i$ is stored in bits [127:96], $b_i$ is stored in bits [95:64], $c_i$ is stored in bits [63:32], and $d_i$ is stored in bits [31:0], although this particular order is not required.

SHA2 execution logic 812B is operable to store a 128-bit packed data result in the destination 818B in response to the instruction. In some embodiments, the result includes four updated state data elements $e_{i+2}$, $f_{i+2}$, $g_{i+2}$, and $h_{i+2}$ that have been updated from the corresponding state data elements $e_i$, $f_i$, $g_i$, and $h_i$, respectively, by two rounds of the SHA2 hash algorithm. In the illustrated embodiment, $e_{i+2}$ is stored in bits [127:96], $f_{i+2}$ is stored in bits [95:64], $g_{i+2}$ is stored in bits [63:32], and $h_{i+2}$ is stored in bits [31:0], although this particular order is not required. Other embodiments may update the state elements by a single round instead of two rounds, or by more than two rounds.

FIG. 8C is a block diagram of an operation 830C performed by an embodiment of an SHA2 two round high update instruction (SHA2_HI). The instruction specifies or otherwise indicates a first source 814C, specifies or otherwise indicates a second source 816C, and specifies or otherwise indicates a destination 818C. In some embodiments, the first source, second source, and destination may be 128-bit registers or other storage locations.

The first source has a first 128-bit packed data including four 32-bit state data elements $a_i$, $b_i$, $c_i$ and $d_i$. In the illustrated embodiment, $a_i$ is stored in bits [127:96], $b_i$ is stored in bits [95:64], $c_i$ is stored in bits [63:32], and $d_i$ is stored in bits [31:0], although this particular order is not required.

The second source has a second 128-bit packed data including four 32-bit data elements. In some embodiments, the second 128-bit packed data may be equal or identical to the result of the SHA2 input instruction of FIG. 8A. In some embodiments, the destination 818A of the SHA2 input instruction of FIG. 8A may be indicated as the second source 816C of the SHA2 two round high instruction of FIG. 8C. As shown in the illustration, the second source includes a first data element (Y) is stored in bits [31:0]. The first data element (Y) represents a sum of the message input for the current round W(i) added to the constant input for the current round K(i) (i.e., W(i)+K(i)) added to the state data element $h_i$ for the current round added to an evaluation of the Ch function with the state elements $e_i$, $f_i$, and $g_i$ for the current round (i.e., Ch($e_i$, $f_i$, $g_i$) added to an evaluation of the sigma1 function with the state element $e_i$ for the current round (i.e., $\Sigma_i(e_i)$). A second data element (X) is stored in bits [63:32]. The second data element (X) represents a sum of the message input for one round after the current round W(i+1) added to the constant input for one round after the current round K(i+1) (i.e., W(i+1) plus K(i+1)) added to the state data element $g_i$ for the current round. The second source also includes the state data element $f_i$ for the current round stored in bits [95:64] and the state data element $e_i$ for the current round stored in bits [127:96]. This particular order in the second source is not required.

SHA2 execution logic 812C is operable to store a 128-bit packed data result in the destination 818C in response to the instruction. In some embodiments, the result includes four updated state data elements $a_{i+2}$, $b_{i+2}$, $c_{i+2}$, and $d_{i+2}$ that have been updated from the corresponding state data elements $a_i$, $b_i$, $c_i$, and $d_i$, respectively, by two rounds of the SHA2 hash algorithm. In the illustrated embodiment, $a_{i+2}$ is stored in bits [127:96], $b_{i+2}$ is stored in bits [95:64], $c_{i+2}$ is stored in bits [63:32], and $d_{i+2}$ is stored in bits [31:0], although this particular order is not required. Other embodiments may update the state elements by a single round instead of two rounds, or by more than two rounds.

In some embodiments, the execution of the SHA2 input instruction, the SHA2 update low instruction, and the SHA2 update high instruction may complete two rounds of the SHA2 algorithm in on the order of about 6 cycles total or 3 cycles per round. In one aspect, the SHA2 input instruction may be performed first in a pipeline of about 3 cycles followed by the SHA2 update low and SHA2 update high instructions in a subsequent about 3 cycle pipeline. One of the update instructions may be effectively hidden within the execution of the other (e.g., may follow the other by one cycle).

Embodiments of instructions that indicate only two source operands have been described. Other embodiments pertain to instructions that indicate three source operands. In some embodiments, each of these three source operands have packed data that is at most half of a width in bits of the combined width of the eight state elements of the SHA2 hash algorithm.

FIG. 9 is a block diagram of an operation 930 performed by an embodiment of an SHA2 128-bit data two round instruction (SHA256_2RND). The instruction specifies or otherwise indicates a first source 914, specifies or otherwise indicates a second source 916, specifies or otherwise indicates a third source 944, and specifies or otherwise indicates a destination 918. In some embodiments, one of the first, second, and third sources is reused as the destination. In some embodiments, the first source, the second source, possibly the third source, and the destination may be 128-bit registers or other storage locations.

The first source has a first 128-bit packed data including four 32-bit state data elements $c_i$, $d_i$, $g_i$, and $h_i$. For example, in the illustration $h_i$ is stored in bits [31:0], $g_i$ is stored in bits [63:32], $d_i$ is stored in bits [95:64], and $c_i$ is stored in bits [127:96], although this particular order is not required.

The second source has a second 128-bit packed data including four 32-bit state data elements ai, bi, ei, and fi. For example, in the illustration fi is stored in bits [31:0], ei is stored in bits [63:32], bi is stored in bits [95:64], and ai is stored in bits [127:96], although this particular order is not required.

The third source has a third packed data including two 32-bit data elements representing message and constant inputs for two rounds of the SHA2 algorithm (i.e., the current round and one round after the current round). As shown, in some embodiments, the third source and/or third packed data may be 128-bits wide with half of the bits (e.g., an upper half) being don't care values (*) and the other half of the bits holding the two 32-bit data elements. Alternatively, the data may be arranged differently. As another option, 64-bit sources and/or packed data having two 32-bit data elements may be used. In the illustrated embodiment, a first data element representing a message input for the current round W(i) added to a constant input for the current round K(i) is stored in [31:0], and a second data element representing a message input for one round after the current round W(i+1) added to a constant input for one round after the current round K(i+1) is stored in [63:32]. In another embodiment, each of W(i), W(i+1), K(i), and K(i+1) may be stored in a different one of four 32-bit data elements of a 128-bit packed data.

SHA2 execution logic 912 is operable to store a 128-bit packed data result in the destination 918 in response to the instruction. In some embodiments, the result includes four updated state data elements $a_{i+2}$, $b_{i+2}$, $e_{i+2}$, and $f_{i+2}$ that have been updated from the corresponding state data elements $a_i$, $b_i$, $e_i$, and $f_i$, respectively, by two rounds of the SHA2 hash algorithm. In the illustrated embodiment, $a_{i+2}$ is stored in bits [127:96], $b_{i+2}$ is stored in bits [95:64], $e_{i+2}$ is stored in bits [63:32], and $f_{i+2}$ is stored in bits [31:0], although this particular order is not required. Other embodiments may update the state elements by a single round instead of two rounds, or by more than two rounds (e.g., four rounds).

FIG. 10 is a block diagram of an operation 1030 performed by an embodiment of an SHA2 256-bit data two round instruction (SHA512RNDS2). The instruction/operation are similar to those of FIG. 9 except that they are for SHA2 algorithms with twice as much state (i.e., 512-bits of state instead of 256-bits of state), operate on state elements and message and constant inputs that are twice as large (i.e., 64-bits instead of 32-bits), and use packed data that are twice as large (i.e., 256-bits instead of 128-bits).

The instruction specifies or otherwise indicates a first source 1014, specifies or otherwise indicates a second source 1016, specifies or otherwise indicates a third source 1044, and specifies or otherwise indicates a destination 1018. In some embodiments, one of the first, second, and third sources is reused as the destination. In some embodiments, the first source, the second source, possibly the third source, and the destination may be 256-bit registers or other storage locations.

The first source has a first 256-bit packed data including four 64-bit state data elements $c_i$, $d_i$, $g_i$, and $h_i$. For example, in the illustration $h_i$ is stored in bits [63:0], $g_i$ is stored in bits [127:64], $d_i$ is stored in bits [191:128], and $c_i$ is stored in bits [255:192], although this particular order is not required.

The second source has a second 256-bit packed data including four 64-bit state data elements $a_i$, $b_i$, $e_i$, and $f_i$. For example, in the illustration $f_i$ is stored in bits [63:0], $e_i$ is stored in bits [127:64], $b_i$ is stored in bits [191:128], and $a_i$ is stored in bits [255:192], although this particular order is not required.

The third source has a third packed data including two 64-bit data elements representing message and constant inputs for two rounds of the SHA2 algorithm (i.e., the current round and one round after the current round). As shown, in some embodiments, the third source and/or third packed data may be 256-bits wide with half of the bits (e.g., an upper half) being don't care values (*) and the other half of the bits holding the two 64-bit data elements. Alternatively, the data may be arranged differently. As another option, 128-bit sources and/or packed data having two 64-bit data elements may be used. In the illustrated embodiment, a first data element representing a message input for the current round W(i) added to a constant input for the current round K(i) is stored in [63:0], and a second data element representing a message input for one round after the current round W(i+1) added to a constant input for one round after the current round K(i+1) is stored in [127:64]. In another embodiment, each of W(i), W(i+1), K(i), and K(i+1) may be stored in a different one of four 64-bit data elements of a 256-bit packed data.

SHA2 execution logic 1012 is operable to store a 256-bit packed data result in the destination 1018 in response to the instruction. In some embodiments, the result includes four updated 64-bit state data elements $a_{i+2}$, $b_{i+2}$, $e_{i+2}$, and $f_{i+2}$ that have been updated from the corresponding state data elements $a_i$, $b_i$, $e_i$, and $f_i$, respectively, by two rounds of the SHA2 hash algorithm. In the illustrated embodiment, $a_{i+2}$ is stored in bits [255:192], $b_{i+2}$ is stored in bits [191:128], $e_{i+2}$ is stored in bits [127:64], and $f_{i+2}$ is stored in bits [63:0], although this particular order is not required. Other embodiments may update the state elements by a single round instead of two rounds, or by more than two rounds (e.g., four rounds).

FIGS. 9-10 utilize the novel arrangement of the state variables $a_i$, $b_i$, $e_i$ and $f_i$ in one source. As discussed above, the current round state variables $a_i$, $b_i$, $e_i$ and $f_i$ are equivalent to the round i+2 state variables $c_{i+2}$, $d_{i+2}$, $g_{i+2}$, and $h_{i+2}$, respectively. The current round state variables $a_i$, $b_i$, $e_i$ and $f_i$ are stored in the second source. Advantageously, the round i+2 state variables $c_{i+2}$, $d_i$, $g_{i+2}$, and $h_{i+2}$ do not need to be calculated separately. Rather, the current round state variables $a_i$, $b_i$, $e_i$ and $f_i$ may merely be reused as the round i+2 state variables $c_{i+2}$, $d_{i+2}$, $g_{i+2}$, and $h_{i+2}$. For example, the current round state variables $a_i$, $b_i$, $e_i$ and $f_i$ in the second source may be combined with the result in the destination to provide the complete set of the eight updated state data elements that have all been updated by two rounds. As another example, a subsequent instruction may indicate the current round state variables $a_i$, $b_i$, $e_i$ and $f_i$ in the second source as if they were the round i+2 state variables $c_{i+2}$, $d_{i+2}$, $g_{i+2}$, and $h_{i+2}$ and they may be processed as such and used to generate, for example, the round i+4, etc.

Advantageously, the instruction/operation allows updating the values of all eight state elements of the SHA2 algorithm by two rounds by executing a single instructions, with the exception of some operations to generate and add the message and constant inputs (e.g., W(i)+K(i)), etc. The novel arrangement of the state elements $a_i$, $b_i$, $e_i$ and $f_i$ is helpful in this regard. In addition, the registers can be half the combined with of the state elements of the SHA2 algorithm. Use of such smaller registers, and associated execution widths, as opposed to using twice the register and execution width, generally helps to reduce the cost and power consumption of the processors or integrated circuits. This may tend to make implementation of these instructions useful for low cost and/or mobile or battery powered electronic devices.

FIG. 11 is a block diagram of an operation 1130 performed by an embodiment of an SHA2 128-bit data four round instruction (SHA256_4RND). The instruction specifies or otherwise indicates a first source 1114, specifies or otherwise indicates a second source 1116, specifies or otherwise indicates a third source 1144, specifies or otherwise indicates a first destination 1118A, and specifies or otherwise indicates a second destination 1118B. In some embodiments, one of the sources is reused as the first destination and another of the sources is reused as the second destination. In some embodiments, the first source, the second source, the third source, and the destination may be 128-bit registers or other storage locations.

The first source has a first 128-bit packed data including four 32-bit state data elements $c_i$, $d_i$, $g_i$, and $h_i$. For example, in the illustration $h_i$ is stored in bits [31:0], $g_i$ is stored in bits [63:32], $d_i$ is stored in bits [95:64], and $c_i$ is stored in bits [127:96], although this particular order is not required.

The second source has a second 128-bit packed data including four 32-bit state data elements $a_i$, $b_i$, $e_i$, and $f_i$. For example, in the illustration $f_i$ is stored in bits [31:0], $e_i$ is stored in bits [63:32], $b_i$ is stored in bits [95:64], and $a_i$ is stored in bits [127:96], although this particular order is not required.

The third source has a third 128-bit packed data including four 32-bit data elements representing message and constant inputs for four rounds of the SHA2 algorithm (i.e., the current round (i), one round after the current round (i+1), two rounds after the current round (i+2), and three rounds after the current round (i+3)). In the illustrated embodiment, a first data element representing a message input for the current round W(i) added to a constant input for the current round K(i) is stored in [31:0], and a second data element representing a message input for one round after the current round W(i+1) added to a constant input for one round after the current round K(i+1) is stored in [63:32]. Continuing, a third data element representing a message input for two rounds after the current round W(i+2) added to a constant input for two rounds after the current round K(i+2) is stored in [63:32], and a fourth data element representing a message input for three rounds after the current round W(i+3) added to a constant input for three rounds after the current round K(i+3) is stored in [63:32]. In other embodiments, the data may be arranged differently.

SHA2 execution logic 1112 is operable to store a first 128-bit packed data result in a first destination 1118A indicated by the instruction, and a second 128-bit packed data result in a second destination 1118B indicated by the instruction in response to the instruction. In some embodiments, the first 128-bit packed data result includes four updated state data elements $a_{i+2}$, $b_{i+2}$, $e_{i+2}$, and $f_{i+2}$ that have been updated from the corresponding state data elements $a_i$, $b_i$, $e_i$, and $f_i$ respectively, by two rounds of the SHA2 hash algorithm. In the illustrated embodiment, $a_{i+2}$ is stored in bits [127:96], $b_{i+2}$ is stored in bits [95:64], $e_{i+2}$ is stored in bits [63:32], and $f_{i+2}$ is stored in bits [31:0], although this particular order is not required. In some embodiments, the second 128-bit packed data result includes four updated state data elements $a_{i+4}$, $b_{i+4}$, $e_{i+4}$, and $f_{i+4}$ that have been updated from the corresponding state data elements $a_i$, $b_i$, $e_i$, and $f_i$ respectively, by four rounds of the SHA2 hash algorithm. In the illustrated embodiment, $a_{i+4}$ is stored in bits [127:96], $b_{i+4}$ is stored in bits [95:64], $e_{i+4}$ is stored in bits [63:32], and $f_{i+4}$ is stored in bits [31:0], although this particular order is not required.

In some embodiments, the first 128-bit packed data result may be stored in the first destination after two rounds have completed (e.g., about half way through the execution of the instruction) and the second 128-bit packed data result may be stored in the second destination after four rounds have completed (e.g., about fully through the execution of the instruction).

The state variables after two rounds $a_{i+2}$, $b_{i+2}$, $e_{i+2}$ and $f_{i+2}$, which are stored in the first destination 1118A, are equivalent to the state variables after four rounds $c_{i+4}$, $d_{i+4}$, $g_{i+4}$, and $h_{i+4}$, respectively. Advantageously, the state variables after four rounds $c_{i+4}$, $d_{i+4}$, $g_{i+4}$, and $h_{i+4}$, do not need to be calculated separately. Rather, the state variables after two rounds $a_{i+2}$, $b_{i+2}$, $e_{i+2}$ and $f_{+2}$, which are stored in the first destination, may merely be used as the state variables after four rounds $c_{i+4}$, $d_{i+4}$, $g_{i+4}$, and $h_{+4}$. The state variables after two rounds $a_{i+2}$, $b_{i+2}$, $e_{i+2}$ and $f_{+2}$, which are stored in the first destination 1118A, may be combined with the state variables after four rounds $a_{i+4}$, $b_{i+4}$, $e_{i+4}$ and $f_{i+4}$, which are stored in the second destination 1118B, to obtain the set of eight updated state elements each updated by four rounds of the SHA2 algorithm. In some embodiments, the first source may be reused as the first destination and the second source may be reused as the second destination, although this is not required.

Figure 12:
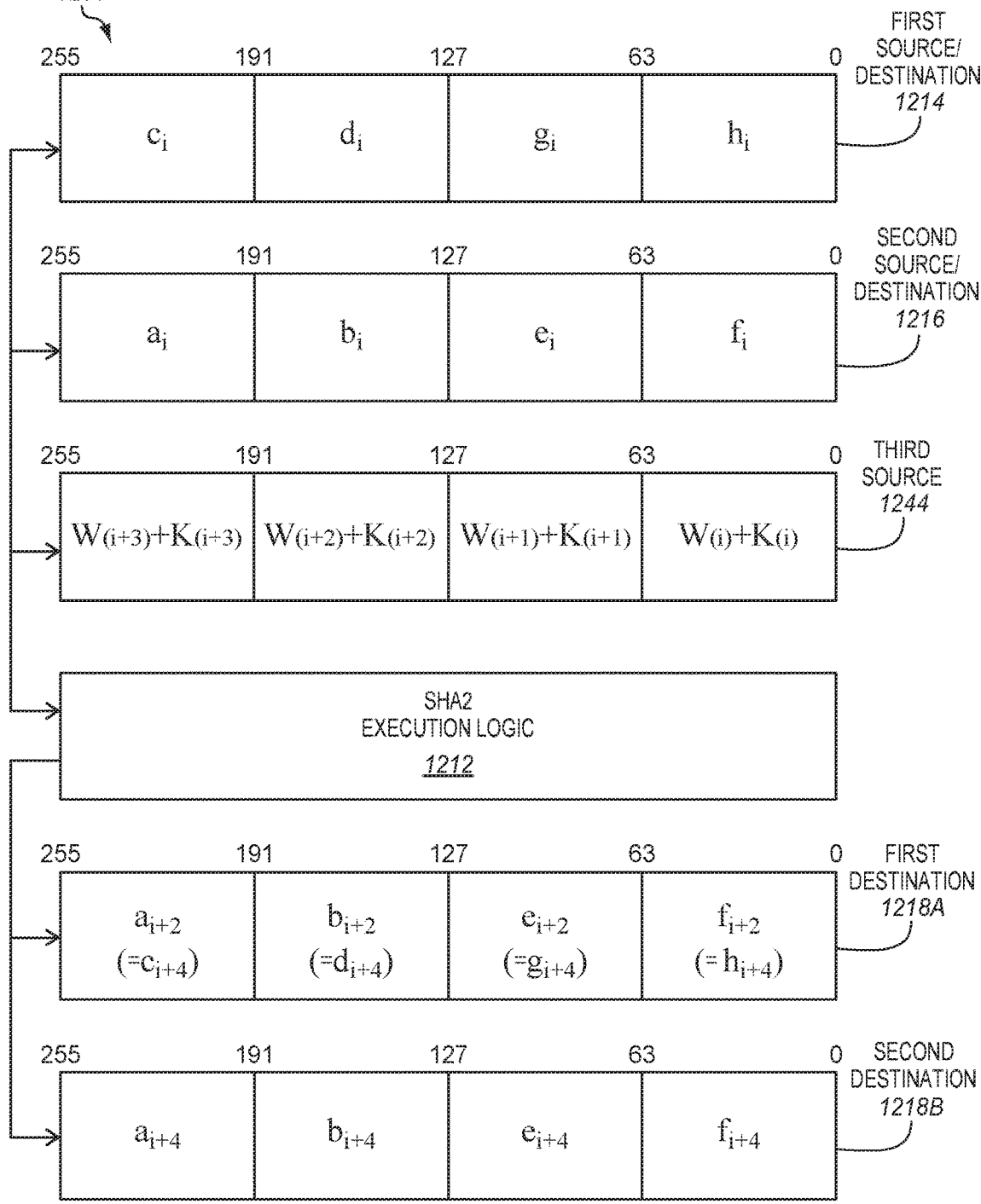
FIG. 12 is a block diagram of an operation performed by an embodiment of an SHA2 512-bit four round instruction.

FIG. 12 is a block diagram of an operation 1230 performed by an embodiment of an SHA2 512-bit data four round instruction (SHA512RNDS4). The instruction/operation are similar to those of FIG. 11 except that they are for SHA2 algorithms with twice as much state (i.e., 512-bits of state instead of 256-bits of state), operate on state elements and message and constant inputs that are twice as large (i.e., 64-bits instead of 32-bits), and use packed data that are twice as large (i.e., 256-bits instead of 128-bits).

The instruction specifies or otherwise indicates a first source 1214, specifies or otherwise indicates a second source 1216, specifies or otherwise indicates a third source 1244, specifies or otherwise indicates a first destination 1218A, and specifies or otherwise indicates a second destination 1218B. In some embodiments, one of the sources is reused as the first destination and another of the sources is reused as the second destination. In some embodiments, the sources and destinations may be 256-bit registers or other storage locations.

The first source has a first 256-bit packed data including four 64-bit state data elements $c_i$, $d_i$, $g_i$, and $h_i$. For example, in the illustration $h_i$ is stored in bits [63:0], $g_i$ is stored in bits [127:64], $d_i$ is stored in bits [191:128], and $c_i$ is stored in bits [255:192], although this particular order is not required.

The second source has a second 256-bit packed data including four 64-bit state data elements $a_i$, $b_i$, $e_i$, and $f_i$. For example, in the illustration $f_i$ is stored in bits [63:0], $e_i$ is stored in bits [127:64], $b_i$ is stored in bits [191:128], and $a_i$ is stored in bits [255:192], although this particular order is not required.

The third source has a third 256-bit packed data including four 64-bit data elements representing message and constant inputs for four rounds of the SHA2 algorithm (i.e., the current round (i), one round after the current round (i+1), two rounds after the current round (i+2), and three rounds after the current round (i+3)). In the illustrated embodiment, a first data element representing a message input for the current round W(i) added to a constant input for the current round K(i) is stored in [63:0], and a second data element representing a message input for one round after the current round W(i+1) added to a constant input for one round after the current round K(i+1) is stored in [127:64]. Continuing, a third data element representing a message input for two rounds after the current round W(i+2) added to a constant input for two rounds after the current round K(i+2) is stored in [191:128], and a fourth data element representing a message input for three rounds after the current round W(i+3) added to a constant input for three rounds after the current round K(i+3) is stored in [255:192]. In other embodiments, the data may be arranged differently.

SHA2 execution logic 1212 is operable to store a first 256-bit packed data result in a first destination 1218A indicated by the instruction, and a second 256-bit packed data result in a second destination 1218B indicated by the instruction in response to the instruction. In some embodiments, the first 256-bit packed data result includes four updated state data elements $a_{i+2}$, $b_{i+2}$, $e_{i+2}$, and $f_{i+2}$ that have been updated from the corresponding state data elements $a_i$, $b_i$, $e_i$, and $f_i$, respectively, by two rounds of the SHA2 hash algorithm. In the illustrated embodiment, $a_{i+2}$ is stored in bits [255:192], $b_{i+2}$ is stored in bits [191:128], $e_{i+2}$ is stored in bits [127:64], and $f_{i+2}$ is stored in bits [63:0], although this particular order is not required. In some embodiments, the second 128-bit packed data result includes four updated state data elements $a_{+}4$, $b_{i+4}$, $e_{i+4}$, and $f_{i+4}$ that have been updated from the corresponding state data elements $a_i$, $b_i$, $e_i$, and $f_i$, respectively, by four rounds of the SHA2 hash algorithm. In the illustrated embodiment, $a_{i+4}$ is stored in bits [255:192], $b_{i+4}$ is stored in bits [191:128], $e_{i+4}$ is stored in bits [127:64], and $f_{i+4}$ is stored in bits [63:0], although this particular order is not required.

In some embodiments, the first 128-bit packed data result may be stored in the first destination after two rounds have completed (e.g., about half way through the execution of the instruction) and the second 128-bit packed data result may be stored in the second destination after four rounds have completed (e.g., about fully through the execution of the instruction).

The state variables after two rounds $a_{i+2}$, $b_{i+2}$, $e_{i+2}$ and $f_{i+2}$, which are stored in the first destination 1218A, are equivalent to the state variables after four rounds $c_{i+4}$, $d_{i+4}$, $g_{i+4}$, and $h_{i+4}$, respectively. Advantageously, the state variables after four rounds $c_{i+4}$, $d_{i+4}$, $g_{i+4}$, and $h_{i+4}$, do not need to be calculated separately. Rather, the state variables after two rounds $a_{i+2}$, $b_{i+2}$, $e_{i+2}$ and $f_{i+2}$, which are stored in the first destination, may merely be used as the state variables after four rounds $c_{i+4}$, $d_{i+4}$, $g_{i+4}$, and $h_{i+4}$. The state variables after two rounds $a_{i+2}$, $b_{i+2}$, $e_{i+2}$ and $f_{i+2}$, which are stored in the first destination 1218A, may be combined with the state variables after four rounds $a_{i+4}$, $b_{i+4}$, $e_{i+4}$ and $f_{i+4}$, which are stored in the second destination 1218B, to obtain the set of eight updated state elements each updated by four rounds of the SHA2 algorithm. In some embodiments, the first source may be reused as the first destination and the second source may be reused as the second destination, although this is not required.

FIGS. 7-12 illustrate a few particular embodiments of suitable instructions/operations. However, many other embodiments are contemplated and will be apparent to those skilled in the art and having the benefit of the present disclosure. For example, in each of these embodiments, the particular order of the data elements (e.g., the state elements) within the sources and destination may optionally be rearranged. For example, rather than storing the state elements in the order a, b, e, f they may instead be stored in any other desired order, such as, for example, in the order f, e, b, a or in the order b, a, f, e or in any other desired order. As another example, any of the embodiments described for SHA2 algorithms with 256-bits of state using 128-bit registers may also be used for SHA2 algorithms with 512-bits of state using 256-bit registers. In each of these embodiments, one or more of the sources may optionally be implicit instead of explicit. In each of these embodiments, a source may either be used as a source/destination or alternatively a separately specified or indicated destination may be used. Moreover, while 128-bit or 256-bit storage locations have been described, larger registers or other storage locations may be used if desired to store the 128-bit or 256-bit packed data.

As mentioned above, the operations are slightly different for SHA-512 than for SHA-256. Although the operations for these algorithms are well known in the art, and described fully in the Secure Hash Standard (SHS) (FIPS PUB 180-3), the set of operations for SHA-512 are as follows:

$\Sigma_0^{512}(a) = (a$ ROTR 28$)$ XOR $(a$ ROTR 34$)$ XOR $(a$ ROTR 39$)$ $\Sigma_0^{512}(e) = (e$ ROTR 14$)$ XOR $(e$ ROTR 18$)$ XOR $(e$ ROTR 41$)$ Maj$(a, b, c) = (a$ AND $b)$ XOR $(a$ AND $c)$ XOR $(b$ AND $c)$ Ch$(e, f, g) = (e$ AND $f)$ XOR $($NOT $e)$ AND $g)$ $T_1 = h + \Sigma_1^{512}(e) + $Ch$(e, f, g) + K_i^{512} + W_i$ $T_2 = \Sigma_0^{512}(a) + $Maj$(a, b, c)$ $h = g$ $g = f$ $f = e$ $e = d + T_1$ $d = c$ $c = b$ $b=a$ $a=T_1+T_2$ FIG. 13A is a block diagram of a first embodiment of a suitable instruction format. The instruction format includes an operation code or opcode 1346A. The opcode may represent a plurality of bits or one or more fields that are operable to identify the instruction and/or the operation to be performed. The instruction format also includes a first source/destination specifier 1348A and a second source specifier 1350A. By way of example, each of these specifiers may include bits or one or more fields to specify an address of a register, memory location, or other storage location. The first source/destination specifier is to specify a storage location that is to have a first source operand and the same specified storage location is also to be used as the destination where the result is to be stored. Alternatively, in another embodiment, one or more of the first source/destination and/or the second source may be implicit to the instruction instead of being explicitly specified. This instruction format specifies or otherwise indicates only two sources. The instructions shown and described above for FIGS. 7-8 are very useful for such instruction formats.

FIG. 13B is a block diagram of a second embodiment of a suitable instruction format. The instruction format includes an operation code or opcode 1346B, a first source/destination specifier 1348B, and a second source specifier 1350B. Each of these may be similar to or the same as those of the first instruction format. This instruction format also includes an optional third source specifier 1352B to specify a third source storage location where a third source operand is stored. Alternatively, the third source storage location may be may be implicit to the instruction instead of being explicitly specified. This instruction format specifies or otherwise indicates three sources. The instructions shown and described above for FIGS. 9-10 are very useful for such instruction formats.

FIG. 13C is a block diagram of a third embodiment of a suitable instruction format. The instruction format includes an operation code or opcode 1346C, a first source/destination specifier 1348C, a second source/destination specifier 1350C, and an optional third source specifier 1352C. Each of these may be similar to or the same as those of the second instruction format except that the second source specifier is also used for a destination. This instruction format specifies or otherwise indicates three sources and two destinations. The instructions shown and described above for FIGS. 11-12 are very useful for such instruction formats. As described above, in some embodiments, one of the destinations may be written about half way through the execution of the instruction after two rounds and the other destination may be written after all four rounds.

These are just a few illustrative embodiments. It is to be appreciated that in other embodiments one of the explicit specifiers may instead be implicit to the instruction. Alternate embodiments may include a subset of the specifiers, may add additional fields, may overlap certain fields, etc. The illustrated order/arrangement of the fields and is not required, but rather the fields may be rearranged. Fields need not include contiguous sequences of bits but rather may be composed of non-contiguous or separated bits. In some embodiments, the instruction format may follow an EVEX encoding or instruction format (e.g., in the case of three source fields and/or instructions for the SHA-512 algorithm), although this is not required.

Figure 14:
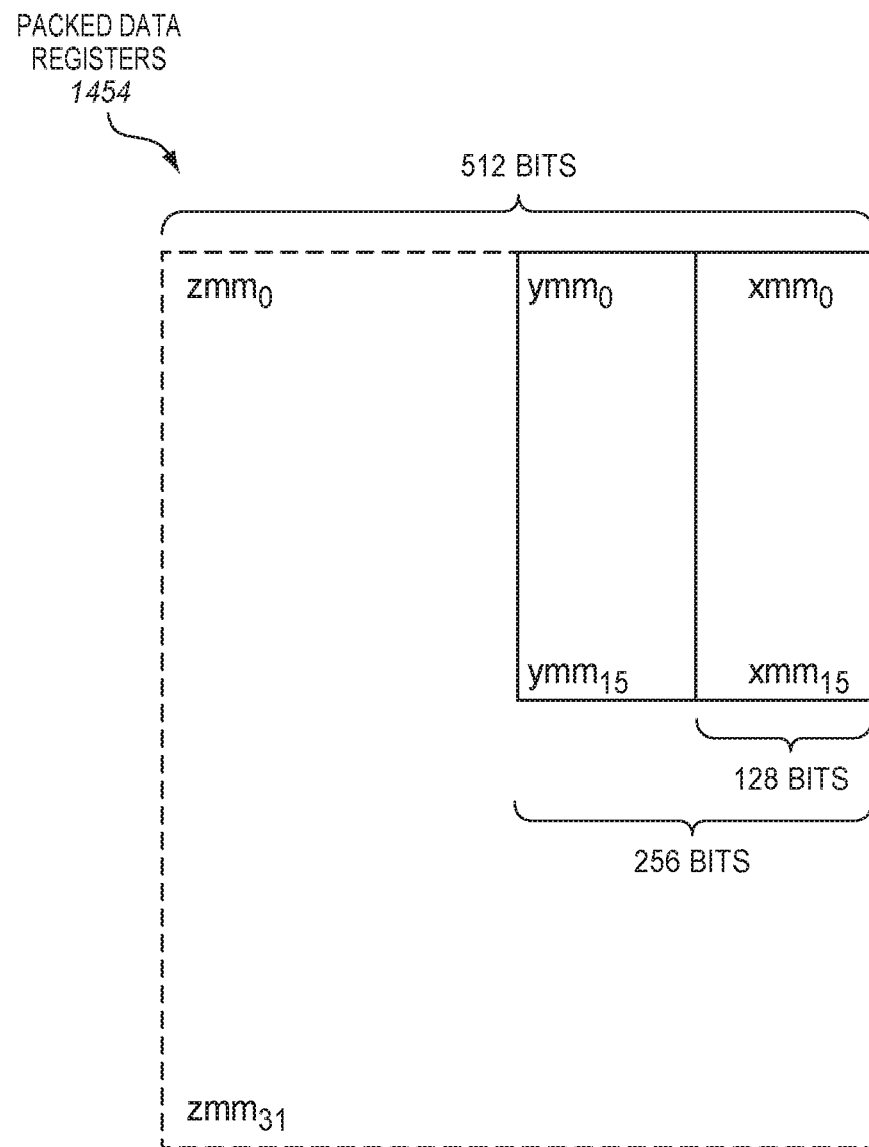
FIG. 14 is a block diagram of an example embodiment of a suitable set of packed data registers.

FIG. 14 is a block diagram of a particular example embodiment of a suitable set of packed data or vector registers 1454. The packed data registers include thirty-two 512-bit packed data registers labeled ZMM0 through ZMM31. In the illustrated embodiment, the lower order 256-bits of the lower sixteen of these registers, namely ZMM0-ZMM15, are aliased or overlaid on respective 256-bit packed data registers labeled YMM0-YMM15, although this is not required. Likewise, the lower order 128-bits of YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, and/or 128-bit packed data. The 256-bit registers YMM0-YMM15 are operable to hold 256-bit packed data and/or 128-bit packed data. The 128-bit registers XMM0-XMM1 are operable to hold 128-bit packed data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, may or may not alias larger registers on smaller registers, or be otherwise different than those shown (e.g., may include two or more distinct sets of registers).

The descriptions here are intended to implement the SHA2 algorithms and obtain hashes consistent with the SHA2 algorithms Any inconsistencies herein that would lead to hashes different than those described by the standard (e.g., due to typos or otherwise) are unintentional and erroneous and those skilled in the art will appreciate that the standard is correct and replaces those typos.

Some embodiments pertain to an article of manufacture (e.g., a computer program product) including a machine-readable storage medium that stores at least one of the instructions described elsewhere herein. Any of the instructions disclosed herein are suitable and may be stored on the medium.

In some embodiments, the machine-readable storage medium may be a tangible and/or non-transitory machine-readable storage medium. In various embodiments, the machine-readable storage medium may include a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a semiconductor memory, or a combination thereof. In some embodiments, the medium may include one or more solid data storage materials, such as, for example, a semiconductor data storage material, a phase-change data storage material, a magnetic data storage material, an optical solid data storage material, etc.

Examples of suitable machines include, but are not limited to, processors (e.g., general-purpose processors and special-purpose processors), instruction processing apparatus, and electronic devices having one or more processors or instruction processing apparatus. Examples of suitable electronic devices include, but are not limited to, desktop computers, laptop computers, notebook computers, cellular phones, handheld or mobile computers, servers, network elements, set-top boxes, other types of computer systems, and the like.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see INTEL® 64 and IA-32 Architectures Software Developers Manual, October 2011; and see INTEL® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 158 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 15A illustrates an exemplary AVX instruction format including a VEX prefix 1502, real opcode field 1530, Mod R/M byte 1540, SIB byte 1550, displacement field 1562, and IMM8 1572. FIG. 15B illustrates which fields from FIG. 15A make up a full opcode field 1574 and a base operation field 1542. FIG. 15C illustrates which fields from FIG. 15A make up a register index field 1544.

VEX Prefix (Bytes 0-2) 1502 is encoded in a three-byte form. The first byte is the Format Field 1540 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1505 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1518 (VEX byte 1, bits [4:0]-mmmmm) includes content to encode an implied leading opcode byte. W Field 1564 (VEX byte 2, bit [7]-W)—is represented by the notation VEX.W, and provides different functions depending on the instruction. The role of VEX.vvvv 1523 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 1568 Size field (VEX byte 2, bit [2]-L)=0, it indicates 158 bit vector; if VEX.L=1, it indicates 256 bit vector. Prefix encoding field 1525 (VEX byte 2, bits [1:0]-pp) provides additional bits for the base operation field.

Real Opcode Field 1530 (Byte 3) is also known as the opcode byte. Part of the opcode is specified in this field.

MOD R/M Field 1540 (Byte 4) includes MOD field 1542 (bits [7-6]), Reg field 1544 (bits [5-3]), and R/M field 1546 (bits [2-0]). The role of Reg field 1544 may include the following: encoding either the destination register operand or a source register operand (the rrr of Rrrr), or be treated as an opcode extension and not used to encode any instruction operand. The role of R/M field 1546 may include the following: encoding the instruction operand that references a memory address, or encoding either the destination register operand or a source register operand.

Scale, Index, Base (SIB)—The content of Scale field 1550 (Byte 5) includes SS1552 (bits [7-6]), which is used for memory address generation. The contents of SIB.xxx 1554 (bits [5-3]) and SIB.bbb 1556 (bits [2-0]) have been previously referred to with regard to the register indexes Xxxx and Bbbb.

The Displacement Field 1562 and the immediate field (IMM8) 1572 contain address data.

Exemplary Register Architecture

Figure 16:
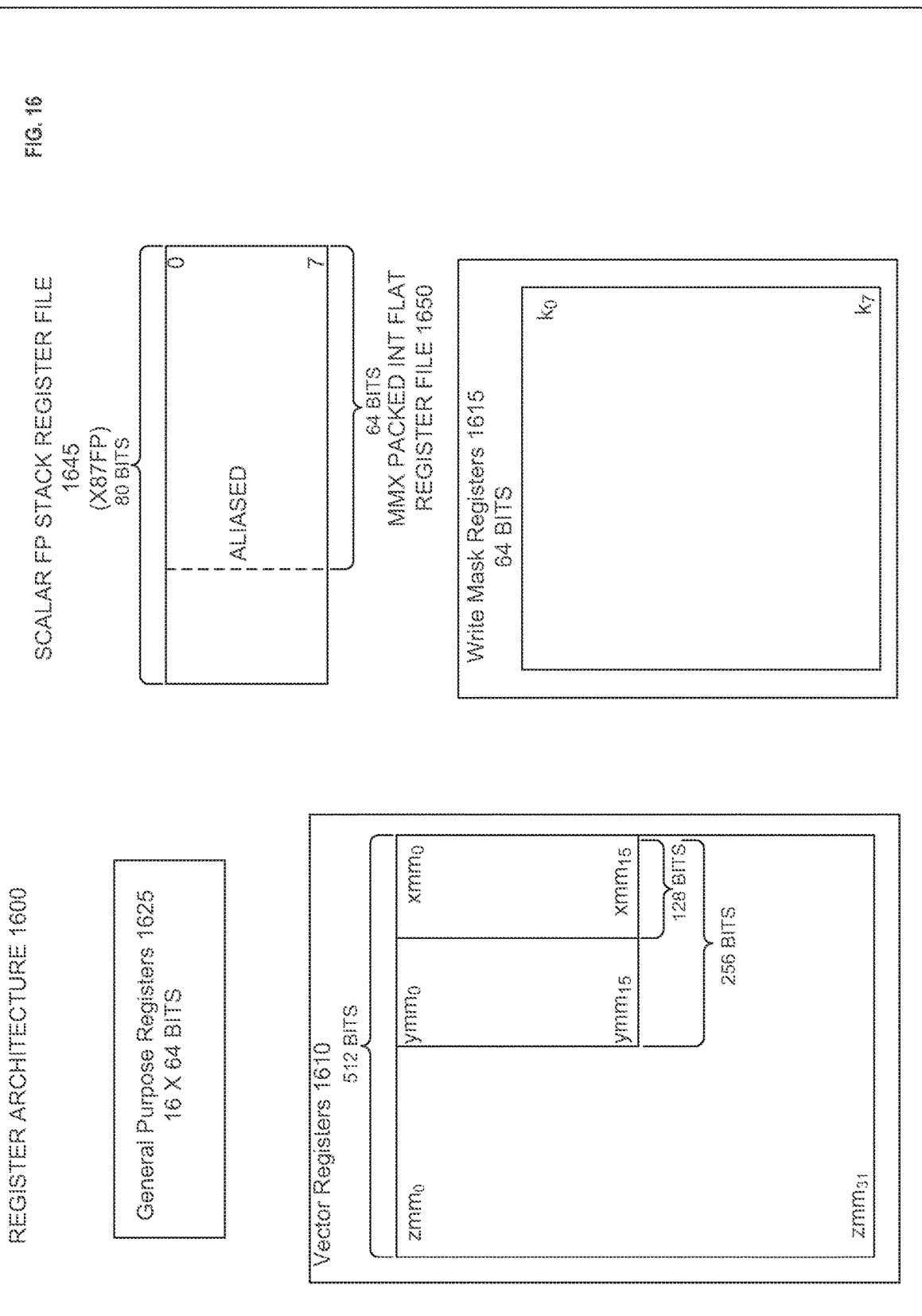
FIG. 16 is a block diagram of a register architecture according to one embodiment of the invention.

FIG. 16 is a block diagram of a register architecture 1600 according to one embodiment of the invention. In the embodiment illustrated, there are 32 vector registers 1610 that are 515 bits wide; these registers are referenced as zmm0 through zmm31. The lower order 256 bits of the lower 19 zmm registers are overlaid on registers ymm0-19. The lower order 158 bits of the lower 19 zmm registers (the lower order 158 bits of the ymm registers) are overlaid on registers xmm0-18.

Write mask registers 1618—in the embodiment illustrated, there are 8 write mask registers (k0 through k7), each 64 bits in size. In an alternate embodiment, the write mask registers 1618 are 19 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R18.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 17:
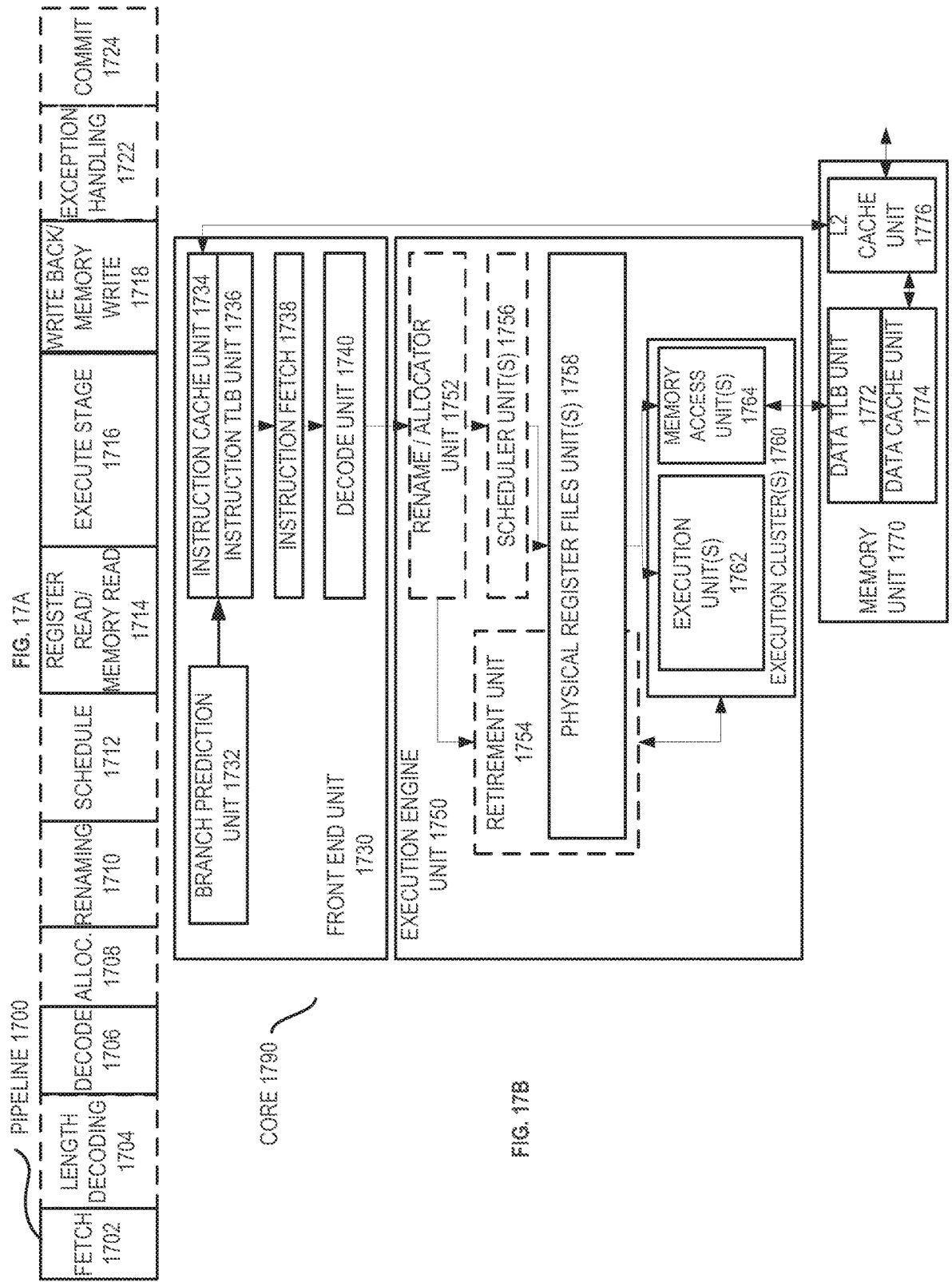
FIG. 17A is a block diagram illustrating both an exemplary in-order pipeline and an exemplary register renaming, out-of-order issue/execution pipeline according to embodiments of the invention.
FIG. 17B shows processor core including a front end unit coupled to an execution engine unit, and both are coupled to a memory unit.

FIG. 17A is a block diagram illustrating both an exemplary in-order pipeline and an exemplary register renaming, out-of-order issue/execution pipeline according to embodiments of the invention. FIG. 17B is a block diagram illustrating both an exemplary embodiment of an in-order architecture core and an exemplary register renaming, out-of-order issue/execution architecture core to be included in a processor according to embodiments of the invention. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1715, a register read/memory read stage 1717, an execute stage 1719, a write back/memory write stage 1721, an exception handling stage 1722, and a commit stage 1724.

FIG. 17B shows processor core 1790 including a front end unit 1730 coupled to an execution engine unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode unit 1740 or otherwise within the front end unit 1730). The decode unit 1740 is coupled to a rename/allocator unit 1752 in the execution engine unit 1750.

The execution engine unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1715; 5) the physical register file(s) unit(s) 1758 and the memory unit 1770 perform the register read/memory read stage 1717; the execution cluster 1760 perform the execute stage 1719; 6) the memory unit 1770 and the physical register file(s) unit(s) 1758 perform the write back/memory write stage 1721; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the INTEL® Hyperthreading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 18:
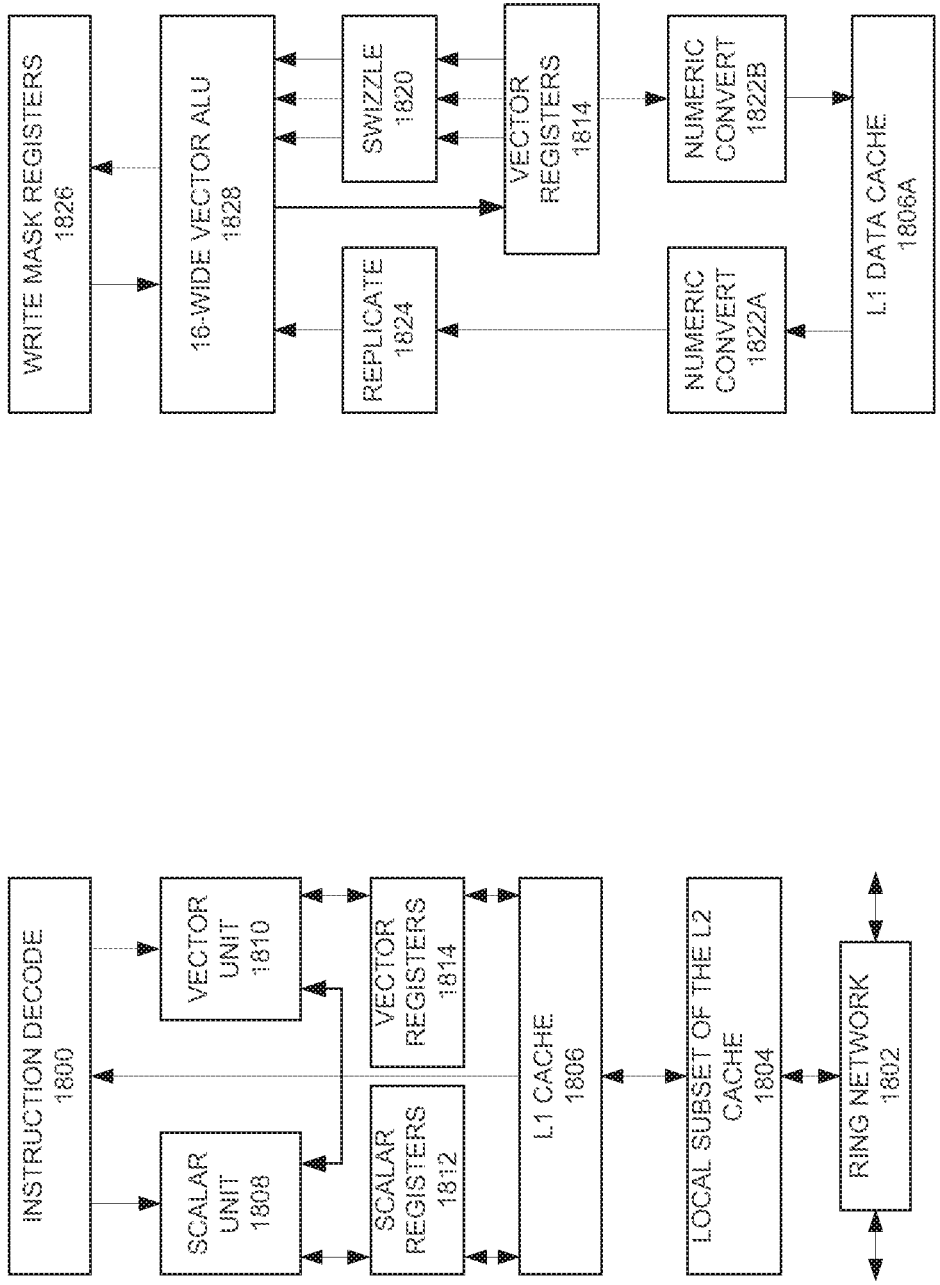
FIG. 18A is a block diagram of a single processor core, along with its connection to the on-die interconnect network and with its local subset of the Level 2 (L2) cache, according to embodiments of the invention.
FIG. 18B is an expanded view of part of the processor core in FIG. 18A according to embodiments of the invention.

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the invention. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1815 and vector registers 1817) and data transferred between them is written to memory and then read back in from a level 1 (L1) cache 1806, alternative embodiments of the invention may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1015-bits wide per direction.

FIG. 18B is an expanded view of part of the processor core in FIG. 18A according to embodiments of the invention. FIG. 18B includes an L1 data cache 1806A part of the L1 cache 1804, as well as more detail regarding the vector unit 1810 and the vector registers 1817. Specifically, the vector unit 1810 is a 19-wide vector processing unit (VPU) (see the 19-wide ALU 1828), which executes one or more of integer, single-precision float, and double-precision float instructions. The VPU supports swizzling the register inputs with swizzle unit 1823, numeric conversion with numeric convert units 1822A-B, and replication with replication unit 1824 on the memory input. Write mask registers 1826 allow predicating resulting vector writes.

Processor with Integrated Memory Controller and Graphics

Figure 19:
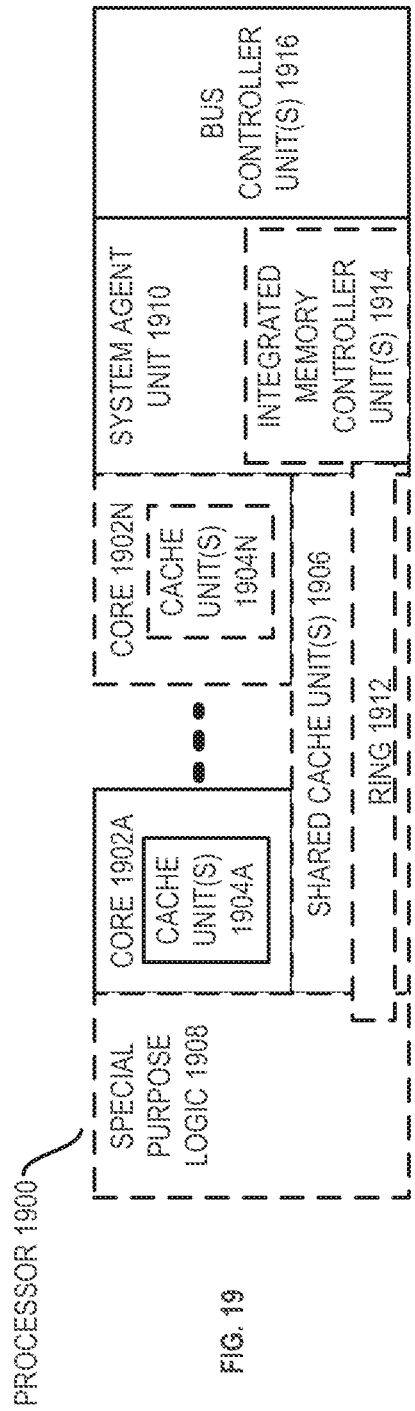
FIG. 19 is a block diagram of a processor that may have more than one core, may have an integrated memory controller, and may have integrated graphics according to embodiments of the invention.

FIG. 19 is a block diagram of a processor 1900 that may have more than one core, may have an integrated memory controller, and may have integrated graphics according to embodiments of the invention. The solid lined boxes in FIG. 19 illustrate a processor 1900 with a single core 1902A, a system agent 1910, a set of one or more bus controller units 1919, while the optional addition of the dashed lined boxes illustrates an alternative processor 1900 with multiple cores 1902A-N, a set of one or more integrated memory controller unit(s) 1917 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1917. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1915 interconnects the integrated graphics logic 1908, the set of shared cache units 1906, and the system agent unit 1910/integrated memory controller unit(s) 1917, alternative embodiments may use any number of well-known techniques for interconnecting such units. In one embodiment, coherency is maintained between one or more cache units 1906 and cores 1902-A-N.

In some embodiments, one or more of the cores 1902A-N are capable of multi-threading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 20:
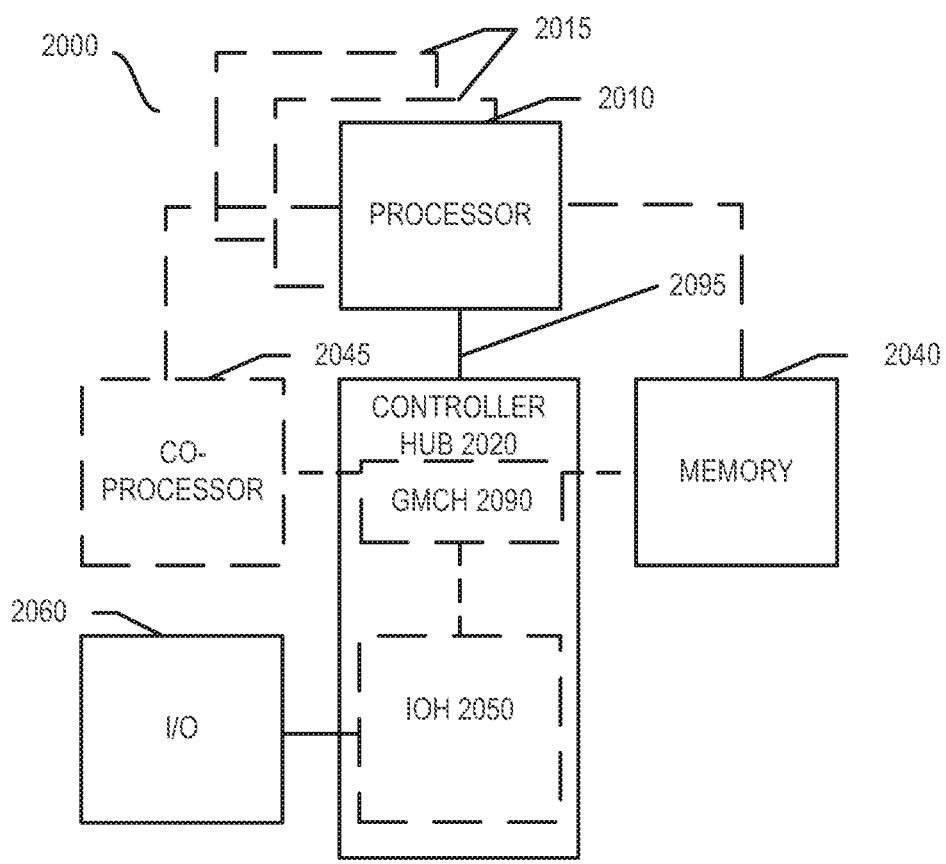
FIG. 20, shown is a block diagram of a system in accordance with one embodiment of the present invention.

Referring now to FIG. 20, shown is a block diagram of a system 2000 in accordance with one embodiment of the present invention. The system 2000 may include one or more processors 2010, 2018, which are coupled to a controller hub 2023. In one embodiment the controller hub 2023 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 is couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2023 in a single chip with the IOH 2050.

The optional nature of additional processors 2018 is denoted in FIG. 20 with broken lines. Each processor 2010, 2018 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2023 communicates with the processor(s) 2010, 2018 via a multi-drop bus, such as a frontside bus (FSB), point-to-point interface such as QuickPath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2023 may include an integrated graphics accelerator.

There can be a variety of differences between the physical resources 2010, 2018 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Figure 21:
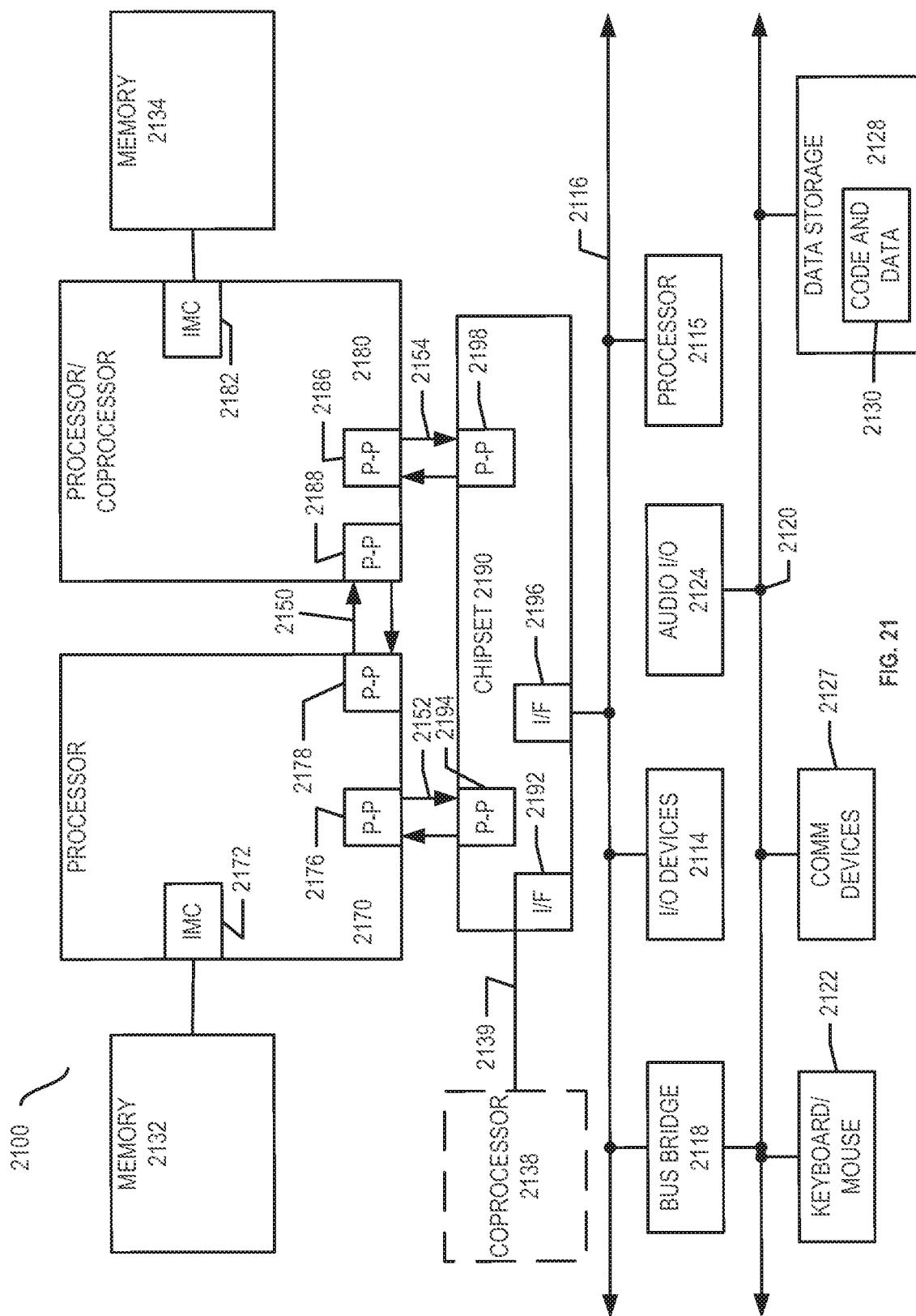
FIG. 21, shown is a block diagram of a first more specific exemplary system in accordance with an embodiment of the present invention.

Referring now to FIG. 21, shown is a block diagram of a first more specific exemplary system 2100 in accordance with an embodiment of the present invention. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In one embodiment of the invention, processors 2170 and 2180 are respectively processors 2010 and 2018, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2139. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2190 may be coupled to a first bus 2119 via an interface 2196. In one embodiment, first bus 2119 may be a Peripheral Component Interconnect (PCI) bus, or a bus such as a PCI Express bus or another third generation I/O interconnect bus, although the scope of the present invention is not so limited.

As shown in FIG. 21, various I/O devices 2117 may be coupled to first bus 2119, along with a bus bridge 2121 which couples first bus 2119 to a second bus 2123. In one embodiment, one or more additional processor(s) 2118, such as coprocessors, high-throughput MIC processors, GPGPU's, accelerators (such as, e.g., graphics accelerators or digital signal processing (DSP) units), field programmable gate arrays, or any other processor, are coupled to first bus 2119. In one embodiment, second bus 2123 may be a low pin count (LPC) bus. Various devices may be coupled to a second bus 2123 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2123. Note that other architectures are possible. For example, instead of the point-to-point architecture of FIG. 21, a system may implement a multi-drop bus or other such architecture.

Figure 22:
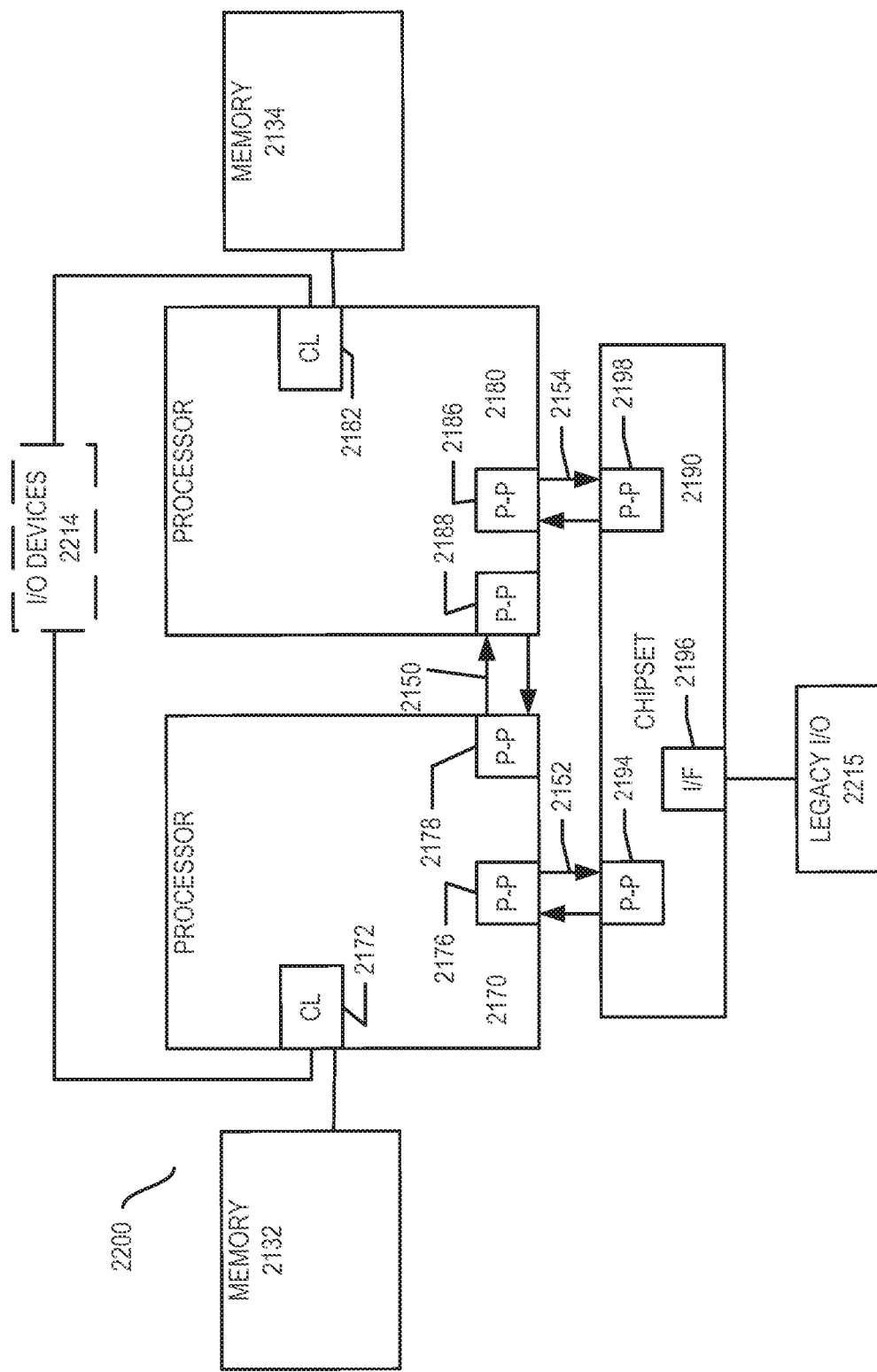
FIG. 22, shown is a block diagram of a second more specific exemplary system in accordance with an embodiment of the present invention.

Referring now to FIG. 22, shown is a block diagram of a second more specific exemplary system 2200 in accordance with an embodiment of the present invention. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2217 are also coupled to the control logic 2172, 2182. Legacy I/O devices 2218 are coupled to the chipset 2190.

Figure 23:
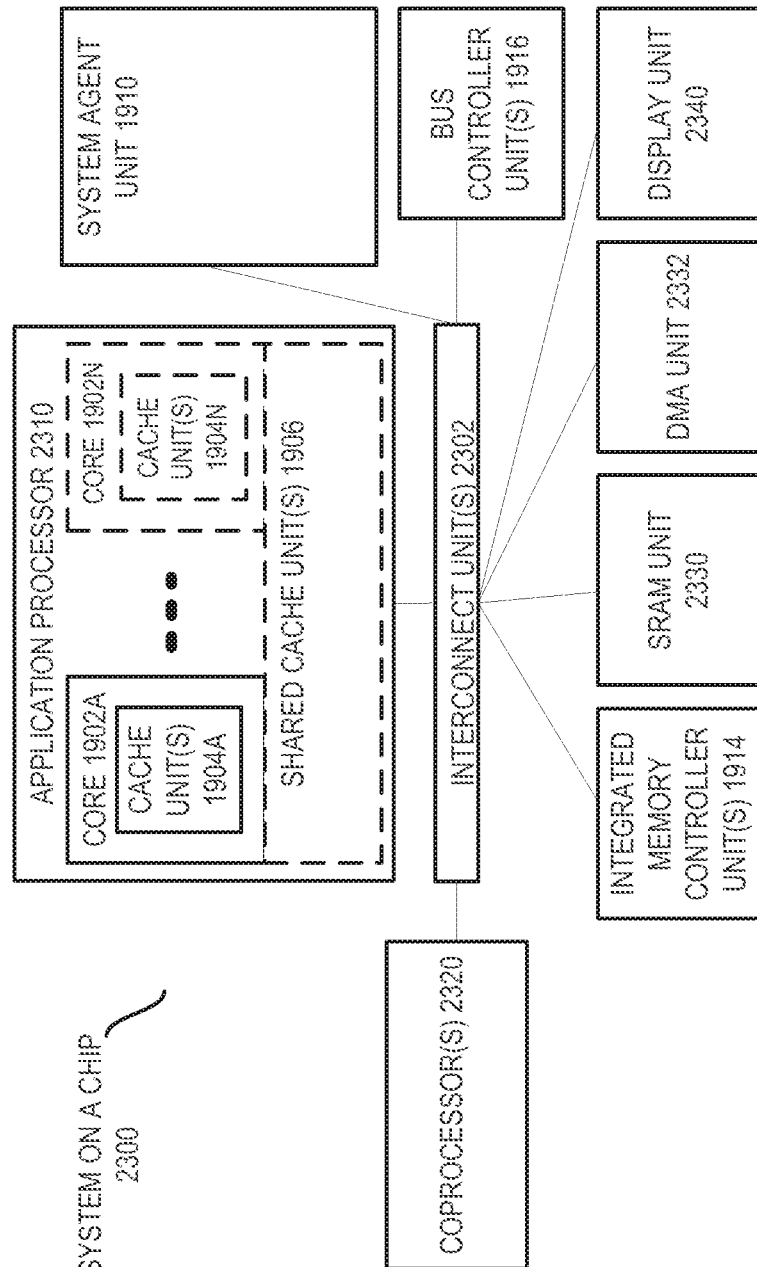
FIG. 23, shown is a block diagram of a SoC in accordance with an embodiment of the present invention.

Referring now to FIG. 23, shown is a block diagram of a SoC 2300 in accordance with an embodiment of the present invention. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 232A-N and shared cache unit(s) 1906; a system agent unit 1910; a bus controller unit(s) 1919; an integrated memory controller unit(s) 1917; a set or one or more coprocessors 2323 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2323 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 24 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 24 shows a program in a high level language 2402 may be compiled using an x86 compiler 2404 to generate x86 binary code 2406 that may be natively executed by a processor with at least one x86 instruction set core 2419. The processor with at least one x86 instruction set core 2419 represents any processor that can perform substantially the same functions as an INTEL processor with at least one x86 instruction set core by compatibly executing or otherwise processing (1) a substantial portion of the instruction set of the INTEL x86 instruction set core or (2) object code versions of applications or other software targeted to run on an INTEL processor with at least one x86 instruction set core, in order to achieve substantially the same result as an INTEL processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2419. Similarly, FIG. 24 shows the program in the high level language 2402 may be compiled using an alternative instruction set compiler 2408 to generate alternative instruction set binary code 2410 that may be natively executed by a processor without at least one x86 instruction set core 2417 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2415 is used to convert the x86 binary code 2406 into code that may be natively executed by the processor without an x86 instruction set core 2417. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2415 represents software, firmware, hardware, or a combination thereof that, through emulation, simulation or any other process, allows a processor or other electronic device that does not have an x86 instruction set processor or core to execute the x86 binary code 2406.

In the description and claims, the term "logic" may have been used. As used herein, the term logic may include but is not limited to hardware, firmware, software, or a combination thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The term "and/or" may have been used. As used herein, the term "and/or" means one or the other or both (e.g., A and/or B means A or B or both A and B).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. All equivalent relationships to those illustrated in the drawings and described in the specification are encompassed within embodiments of the invention. In other instances, well-known circuits, structures, devices, and operations have been shown in block diagram form or without detail in order to avoid obscuring the understanding of the description.

Where considered appropriate, reference numerals or terminal portions of reference numerals have been repeated among the figures to indicate corresponding or analogous elements, which may optionally have similar or the same characteristics unless specified or clearly apparent otherwise. In some cases, where multiple components have been shown and described, they may be incorporated into a single component. In other cases, where a single component has been shown and described, it may be separated into two or more components. In the drawings, arrows represent couplings and bidirectional arrows represent bidirectional couplings.

Various operations and methods have been described. Some of the methods have been described in a relatively basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
a plurality of cores, including a first core comprising:
an instruction cache to store instructions, including a Secure Hash Algorithm 256 (SHA256) instruction of an instruction set of the first core;
a data cache to store data;
instruction fetch circuitry to fetch the instructions from the instruction cache;
instruction decode circuitry to decode the instructions, including the SHA256 instruction;
a first 128-bit source register to hold an initial SHA256 state C in bits [127:96], an initial SHA256 state D in bits [95:64], an initial SHA256 state G in bits [63:32], and an initial SHA256 state H in bits [31:0];
a second 128-bit source register to hold an initial SHA256 state A in bits [127:96], an initial SHA256 state B in bits [95:64], an initial SHA256 state E in bits [63:32], and an initial SHA256 state F in bits [31:0];
a third 128-bit source register to hold a sum of a round message and a round constant; and
execution circuitry that includes SHA2 circuitry to, in response to the instruction decode circuitry decoding the SHA256 instruction,
perform two rounds of a SHA256 operation with the initial SHA256 state C, the initial SHA256 state D, the initial SHA256 state G, and the initial SHA256 state H from the first 128-bit source register, the initial SHA256 state A, the initial SHA256 state B, the initial SHA256 state E, and the initial SHA256 state F from the second 128-bit source register, and the sum of the round message and the round constant from the third 128-bit source register, and
place a resulting SHA256 state A in bits [127:96] of a 128-bit destination register, a resulting SHA256 state B in bits [95:64] of the 128-bit destination register, a resulting SHA256 state E in bits [63:32] of the 128-bit destination register, and a resulting SHA256 state F in bits [31:0] of the 128-bit destination register.

2. A processor comprising:
a plurality of cores, including a first core comprising:
an instruction cache to store instructions, including a Secure Hash Algorithm 256 (SHA256) instruction of an instruction set of the first core;
a data cache to store data;
instruction fetch circuitry to fetch the instructions from the instruction cache;
instruction decode circuitry to decode the instructions; and
execution circuitry that includes SHA2 circuitry to, in response to the instruction decode circuitry decoding the SHA256 instruction,
perform two rounds of a SHA256 operation with an initial SHA256 state C from bits [127:96] of a first 128-bit operand, an initial SHA256 state D from bits [95:64] of the first 128-bit operand, an initial SHA256 state G from bits [63:32] of the first 128-bit operand, an initial SHA256 state H from bits [31:0] of the first 128-bit operand, an initial SHA256 state A from bits [127:96] of a second 128-bit operand, an initial SHA256 state B from bits [95:64] of the second 128-bit operand, an initial SHA256 state E from bits [63:32] of the second 128-bit operand, an initial SHA256 state F from bits [31:0] of the second 128-bit operand, and a sum of a round message and a round constant from a third operand, and
place a resulting SHA256 state A in bits [127:96] of a 128-bit destination register, a resulting SHA256 state B in bits [95:64] of the 128-bit destination register, a resulting SHA256 state E in bits [63:32] of the 128-bit destination register, and a resulting SHA256 state F in bits [31:0] of the 128-bit destination register.

3. The processor of claim 2, further comprising:
a first 128-bit source register to hold the first 128-bit operand;
a second 128-bit source register to hold the second 128-bit operand; and
a third 128-bit source register to hold the third operand.

4. The processor of claim 2, further comprising:
a first 128-bit source register to hold the first 128-bit operand,
a third 128-bit source register to hold the third operand; and
wherein the second 128-bit operand is to be read from a memory.

5. A system comprising:
a system memory to store instructions, including a Secure Hash Algorithm 256 (SHA256) instruction of an instruction set; and
a processor comprising:
a plurality of cores, including a first core comprising:
an instruction cache to store the SHA256 instruction received from the system memory;
a data cache to store data;
instruction fetch circuitry to fetch the SHA256 instruction from the instruction cache;
instruction decode circuitry to decode the SHA256 instruction;
a first 128-bit source register to hold an initial SHA256 state C in bits [127:96], an initial SHA256 state D in bits [95:64], an initial SHA256 state G in bits [63:32], and an initial SHA256 state H in bits [31:0];
a second 128-bit source register to hold an initial SHA256 state A in bits [127:96], an initial SHA256 state B in bits [95:64], an initial SHA256 state E in bits [63:32], and an initial SHA256 state F in bits [31:0];
a third 128-bit source register to hold a sum of a round message and a round constant; and
execution circuitry that includes SHA2 circuitry to, in response to the instruction decode circuitry decoding the SHA256 instruction,
perform two rounds of a SHA256 operation with the initial SHA256 state C, the initial SHA256 state D, the initial SHA256 state G, and the initial SHA256 state H from the first 128-bit source register, the initial SHA256 state A, the initial SHA256 state B, the initial SHA256 state E, and the initial SHA256 state F from the second 128-bit source register, and the sum of the round message and the round constant from the third 128-bit source register, and place a resulting SHA256 state A in bits [127:96] of a 128-bit destination register, a resulting SHA256 state B in bits [95:64] of the 128-bit destination register, a resulting SHA256 state E in bits [63:32] of the 128-bit destination register, and a resulting SHA256 state F in bits [31:0] of the 128-bit destination register.

6. The system of claim 5, wherein the system memory comprises a dynamic random-access memory (DRAM).

7. The system of claim 5, further comprising a graphics processor.

8. The system of claim 5, further comprising a network processor.

9. The system of claim 5, further comprising a storage device to store instructions and data.

10. The system of claim 5, further comprising an input/output (I/O) device.

11. The system of claim 5, further comprising an audio input/output (I/O) device.

12. A system comprising:
a system memory to store instructions, including a Secure Hash Algorithm 256 (SHA256) instruction of an instruction set; and
a processor comprising:
a plurality of cores, including a first core comprising:
an instruction cache to store the SHA256 instruction received from the system memory;
a data cache to store data;
instruction fetch circuitry to fetch the SHA256 instruction from the instruction cache;
instruction decode circuitry to decode the SHA256 instruction; and
execution circuitry that includes SHA2 circuitry to, in response to the instruction decode circuitry decoding the SHA256 instruction,
perform two rounds of a SHA256 operation with an initial SHA256 state C from bits [127:96] of a first 128-bit operand, an initial SHA256 state D from bits [95:64] of the first 128-bit operand, an initial SHA256 state G from bits [63:32] of the first 128-bit operand, an initial SHA256 state H from bits [31:0] of the first 128-bit operand, an initial SHA256 state A from bits [127:96] of a second 128-bit operand, an initial SHA256 state B from bits [95:64] of the second 128-bit operand, an initial SHA256 state E from bits [63:32] of the second 128-bit operand, an initial SHA256 state F from bits [31:0] of the second 128-bit operand, and a sum of a round message and a round constant from a third operand, and
place a resulting SHA256 state A in bits [127:96] of a 128-bit destination register, a resulting SHA256 state B in bits [95:64] of the 128-bit destination register, a resulting SHA256 state E in bits [63:32] of the 128-bit destination register, and a resulting SHA256 state F in bits [31:0] of the 128-bit destination register.

13. The system of claim 12, wherein the processor also comprises:
a first 128-bit source register to hold the first 128-bit operand;
a second 128-bit source register to hold the second 128-bit operand; and
a third 128-bit source register to hold the third operand.

14. The system of claim 12, wherein the processor also comprises:
a first 128-bit source register to hold the first 128-bit operand,
a third 128-bit source register to hold the third operand; and
wherein the second 128-bit operand is to be read from the system memory.

15. A system-on-a-chip (SoC) comprising:
an interconnect coupled to a plurality of processors, including a first processor comprising:
a plurality of cores, including a first core comprising:
an instruction cache to store instructions, including a Secure Hash Algorithm 256 (SHA256) instruction of an instruction set of the first core;
a data cache to store data;
instruction fetch circuitry to fetch the instructions from the instruction cache;
instruction decode circuitry to decode the instructions;
a first 128-bit source register to hold an initial SHA256 state C in bits [127:96], an initial SHA256 state D in bits [95:64], an initial SHA256 state G in bits [63:32], and an initial SHA256 state H in bits [31:0];
a second 128-bit source register to hold an initial SHA256 state A in bits [127:96], an initial SHA256 state B in bits [95:64], an initial SHA256 state E in bits [63:32], and an initial SHA256 state F in bits [31:0];
a third 128-bit source register to hold a sum of a round message and a round constant; and
execution circuitry that includes SHA2 circuitry to, in response to the instruction decode circuitry decoding the SHA256 instruction,
perform two rounds of a SHA256 operation with the initial SHA256 state C, the initial SHA256 state D, the initial SHA256 state G, and the initial SHA256 state H from the first 128-bit source register, the initial SHA256 state A, the initial SHA256 state B, the initial SHA256 state E, and the initial SHA256 state F from the second 128-bit source register, and the sum of the round message and the round constant from the third 128-bit source register, and
place a resulting SHA256 state A in bits [127:96] of a 128-bit destination register, a resulting SHA256 state B in bits [95:64] of the 128-bit destination register, a resulting SHA256 state E in bits [63:32] of the 128-bit destination register, and a resulting SHA256 state F in bits [31:0] of the 128-bit destination register.

16. The SoC of claim 15, wherein the plurality of processors includes a second processor comprising graphics logic.

17. The SoC of claim 15, wherein the plurality of processors includes a network processor.

18. The SoC of claim 15, wherein the plurality of processors includes an image processor.

19. The SoC of claim 15, wherein the plurality of processors includes a video processor.

20. The SoC of claim 15, wherein the plurality of processors includes an audio processor.

21. The SoC of claim 15, further comprising an integrated memory controller.

22. The SoC of claim 15, further comprising a direct memory access (DMA) unit.

23. A processor comprising:
a plurality of cores, including a first core comprising:
instruction cache means for storing instructions, including a Secure Hash Algorithm 256 (SHA256) instruction of an instruction set of the first core;
data cache means for storing data;
instruction fetch means for fetching the instructions from the instruction cache means;
instruction decode means for decoding the instructions;
first 128-bit source means for holding an initial SHA256 state C in bits [127:96], an initial SHA256 state D in bits [95:64], an initial SHA256 state G in bits [63:32], and an initial SHA256 state H in bits [31:0];
second 128-bit source means for holding an initial SHA256 state A in bits [127:96], an initial SHA256 state B in bits [95:64], an initial SHA256 state E in bits [63:32], and an initial SHA256 state F in bits [31:0];
third 128-bit source means for holding a sum of a round message and a round constant; and
execution means including SHA2 means for, in response to the instruction decode means decoding the SHA256 instruction,
performing two rounds of a SHA256 operation with the initial SHA256 state C, the initial SHA256 state D, the initial SHA256 state G, and the initial SHA256 state H from the first 128-bit source means, the initial SHA256 state A, the initial SHA256 state B, the initial SHA256 state E, and the initial SHA256 state F from the second 128-bit source means, and the sum of the round message and the round constant from the third 128-bit source means, and
placing a resulting SHA256 state A in bits [127:96] of a 128-bit destination register, a resulting SHA256 state B in bits [95:64] of the 128-bit destination register, a resulting SHA256 state E in bits [63:32] of the 128-bit destination register, and a resulting SHA256 state F in bits [31:0] of the 128-bit destination register.

24. A method comprising:
storing, in an instruction cache of a multicore processor core, a Secure Hash Algorithm 256 (SHA256) instruction of an instruction set of the core;
fetching, by instruction fetch circuitry of the multicore processor core, the SHA256 instruction from the instruction cache;
decoding, by instruction decode circuitry of the multicore processor core, the SHA256 instruction;
performing, by execution circuitry including SHA2 circuitry of the multicore processor core in response to the instruction decode circuitry decoding the SHA256 instruction, two rounds of a SHA256 operation with an initial SHA256 state C from bits [127:96] of a first 128-bit operand, an initial SHA256 state D from bits [95:64] of the first 128-bit operand, an initial SHA256 state G from bits [63:32] of the first 128-bit operand, an initial SHA256 state H from bits [31:0] of the first 128-bit operand, an initial SHA256 state A from bits [127:96] of a second 128-bit operand, an initial SHA256 state B from bits [95:64] of the second 128-bit operand, an initial SHA256 state E from bits [63:32] of the second 128-bit operand, an initial SHA256 state F from bits [31:0] of the second 128-bit operand, and a sum of a round message and a round constant from a third operand; and
placing a resulting SHA256 state A in bits [127:96] of a 128-bit destination register of the multicore processor core, a resulting SHA256 state B in bits [95:64] of the 128-bit destination register of the multicore processor core, a resulting SHA256 state E in bits [63:32] of the 128-bit destination register of the multicore processor core, and a resulting SHA256 state F in bits [31:0] of the 128-bit destination register of the multicore processor core.

25. The method of claim 24, further comprising:
holding, in a first 128-bit source register of the multicore processor core, the first 128-bit operand;
holding, in a second 128-bit source register of the multicore processor core, the second 128-bit operand; and
holding, in a third 128-bit source register of the multicore processor core, the third operand.

26. The method of claim 24, further comprising:
holding, in a first 128-bit source register of the multicore processor core, the first 128-bit operand;
holding, in a third 128-bit source register of the multicore processor core, the third operand; and
reading, from a memory, the second 128-bit operand.

27. A machine-readable tangible medium storing instructions, which, when executed by a machine, cause the machine to:
fetch a Secure Hash Algorithm 256 (SHA256) instruction of an instruction set of a processor core from an instruction cache;
decode the SHA256 instruction;
perform with SHA2 circuitry, in response to decoding the SHA256 instruction, two rounds of a SHA256 operation with an initial SHA256 state C from bits [127:96] of a first 128-bit operand, an initial SHA256 state D from bits [95:64] of the first 128-bit operand, an initial SHA256 state G from bits [63:32] of the first 128-bit operand, an initial SHA256 state H from bits [31:0] of the first 128-bit operand, an initial SHA256 state A from bits [127:96] of a second 128-bit operand, an initial SHA256 state B from bits [95:64] of the second 128-bit operand, an initial SHA256 state E from bits [63:32] of the second 128-bit operand, an initial SHA256 state F from bits [31:0] of the second 128-bit operand, and a sum of a round message and a round constant from a third operand; and
place a resulting SHA256 state A in bits [127:96] of a 128-bit destination register, a resulting SHA256 state B in bits [95:64] of the 128-bit destination register, a resulting SHA256 state E in bits [63:32] of the 128-bit destination register, and a resulting SHA256 state F in bits [31:0] of the 128-bit destination register.

28. The machine-readable tangible medium of claim 27, wherein executing the instructions also causes the machine to read, from a memory, the second 128-bit operand.

* * * * *